(12) United States Patent
Okuda et al.

(10) Patent No.: US 11,001,074 B2
(45) Date of Patent: May 11, 2021

(54) INK JET RECORDING METHOD AND AN INK JET RECORDING APPARATUS

(71) Applicant: Seiko Epson Corporation, Tokyo (JP)

(72) Inventors: Ippei Okuda, Shiojiri (JP); Kimitaka Kamijo, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/583,382

(22) Filed: Sep. 26, 2019

(65) Prior Publication Data
US 2020/0101758 A1 Apr. 2, 2020

(30) Foreign Application Priority Data
Sep. 27, 2018 (JP) .............................. JP2018-181333

(51) Int. Cl.
*B41J 2/21* (2006.01)
*B41M 5/00* (2006.01)
(Continued)

(52) U.S. Cl.
CPC .......... *B41J 2/2114* (2013.01); *B41J 2/2107* (2013.01); *B41J 2/2117* (2013.01); *B41J 3/543* (2013.01); *B41M 5/0011* (2013.01); *B41M 5/0017* (2013.01); *B41M 5/0047* (2013.01); *B41M 7/0036* (2013.01); *C09D 11/10* (2013.01);
(Continued)

(58) Field of Classification Search
CPC ...... B41J 2/2114; B41J 2/2107; B41J 2/2117; B41J 19/147; B41J 2/211; B41J 2/17503; B41J 2/2103; B41J 3/543; B41M 5/0017; B41M 5/0011; B41M 5/0047; B41M 7/0036; B41M 7/009; C09D 11/54;
(Continued)

(56) References Cited

U.S. PATENT DOCUMENTS

2009/0322814 A1* 12/2009 Sano ...................... B41J 2/2114
                                                                                347/12
2013/0088539 A1    4/2013 Usuda
(Continued)

FOREIGN PATENT DOCUMENTS

JP      2000-044855 A    2/2000
JP      2013-095078 A    5/2013
(Continued)

*Primary Examiner* — Sharon Polk
(74) *Attorney, Agent, or Firm* — Harness, Dickey & Pierce, P.L.C.

(57) ABSTRACT

An ink jet method includes causing a treatment liquid to adhere to a recording medium; a white ink to adhere to the recording medium; and a non-white ink to adhere to the recording medium. The treatment liquid, white ink, and non-white ink are applied by main scans of a recording head and sub-scans of the recording medium that intersect the main scans. The recording head includes a first nozzle group arranged in the sub-scanning direction and discharging the treatment liquid, a second nozzle group arranged in the sub-scanning direction and discharging the white ink, and a third nozzle group arranged in the sub-scanning direction and discharging the non-white ink. The second and third nozzle groups have non-overlapping portions in the main scanning direction, and one or both of the second and third nozzle groups have a portion overlapping the first nozzle group in the main scanning direction.

12 Claims, 5 Drawing Sheets

(51) Int. Cl.
*C09D 11/54* (2014.01)
*C09D 11/10* (2014.01)
*C09D 11/30* (2014.01)
*B41M 7/00* (2006.01)
*B41J 3/54* (2006.01)

(52) U.S. Cl.
CPC .............. *C09D 11/30* (2013.01); *C09D 11/54* (2013.01); *B41M 7/009* (2013.01)

(58) Field of Classification Search
CPC ......... C09D 11/10; C09D 11/30; C09D 11/40; C09D 11/38; C09D 11/322
See application file for complete search history.

(56) References Cited

U.S. PATENT DOCUMENTS

| | | | |
|---|---|---|---|
| 2013/0108842 A1 | 5/2013 | Shiono et al. | |
| 2016/0129702 A1 | 5/2016 | Katagami et al. | |
| 2017/0157921 A1* | 6/2017 | Tashiro | B41J 2/2117 |
| 2019/0061382 A1* | 2/2019 | Okuda | B41J 2/2107 |
| 2019/0283464 A1* | 9/2019 | Matsuzaki | B41J 2/2114 |

FOREIGN PATENT DOCUMENTS

| | | |
|---|---|---|
| JP | 2013-116623 A | 6/2013 |
| JP | 2016-088026 A | 5/2016 |

\* cited by examiner

INK JET RECORDING METHOD AND AN INK JET RECORDING APPARATUS

The present application is based on, and claims priority from, JP Application Serial Number 2018-181333, filed Sep. 27, 2018, the disclosure of which is hereby incorporated by reference herein in its entirety.

BACKGROUND

1. Technical Field

The present disclosure relates to an ink jet recording method and an ink jet recording apparatus.

2. Related Art

An ink jet recording apparatus is an apparatus in which small droplets of ink are discharged from fine nozzles and causes the droplets to adhere to a recording medium to perform recording. The ink jet recording apparatus has a feature that an image having high resolution and high quality can be recorded at a high speed. In an ink jet recording method using the ink jet recording apparatus, there are so many considerations, including stability in recording and quality of an image to be obtained. In addition, not only a study about an improvement of performance of an ink jet recording apparatus but also a study about an ink to be used are lively.

As an ink jet recording method, there is a so-called overprinting method in which a plurality of liquids are stacked on and adhere to the same area of a recording medium. For example, JP-A-2016-088026 discloses a printing method including a first reaction liquid application step, a background color ink application step, a drying step, a second reaction liquid application step, and an image forming ink application step. Then, there is a description that printing is performed using a printing device in which recording heads discharging respective liquids are disposed so as to overlap in a transport direction of a printing substrate.

For example, overprinting can be performed using a white ink and a non-white ink and can be expected to improve quality of an image to be obtained, by effects such as concealment of a background color. Furthermore, when recording is performed by overprinting the white ink and the non-white ink, a bleeding phenomenon of an image to be obtained may be suppressed by fixing the inks at an early stage using a treatment liquid having an action of aggregating an ink component.

However, when the treatment liquid is used in overprinting, although the bleeding phenomenon tends to be suppressed, cracks may occur in an image. Therefore, it was difficult to perform ink jet recording in which a high image quality with little bleeding and the like was maintained, and cracks hardly occurred in an image.

SUMMARY (1) According to an aspect of the present disclosure, an ink jet recording method includes: a treatment liquid adhesion step of causing a treatment liquid containing an aggregating agent to adhere to a recording medium; a white ink adhesion step of causing a white ink containing a white pigment to adhere to the recording medium by an ink jet method; and a non-white ink adhesion step of causing a non-white ink containing a non-white coloring material to adhere to the recording medium by the ink jet method, in which the treatment liquid adhesion step, the white ink adhesion step, and the non-white ink adhesion step are performed by plural times of main scanning in which a recording head moves in a main scanning direction and plural times of sub-scanning in which the recording medium moves in a sub-scanning direction intersecting the main scanning direction, the recording head includes a first discharge nozzle group in which nozzles are arranged in the sub-scanning direction and discharge the treatment liquid, a second discharge nozzle group in which nozzles are arranged in the sub-scanning direction and discharge the white ink, and a third discharge nozzle group in which nozzles are arranged in the sub-scanning direction and discharge the non-white ink, the second discharge nozzle group and the third discharge nozzle group have portions that do not overlap each other when projected in the main scanning direction, and one or both of the second discharge nozzle group and the third discharge nozzle group have a portion overlapping the first discharge nozzle group when projected in the main scanning direction.

(2) In the method of (1), the treatment liquid adhesion step may be performed on a recording area of the recording medium, before the white ink adhesion step and the non-white ink adhesion step.

(3) In the method of (1) or (2), thickening ratios of the white ink and the non-white ink when mixed with the treatment liquid may be 1.2 or more.

(4) In the method of any of (1) to (3), the treatment liquid adhesion step, the white ink adhesion step, and the non-white ink adhesion step may be performed on the recording medium heated.

(5) In the method of any of (1) to (4), the recording may be performed on a low-absorbent recording medium or a non-absorbent recording medium.

(6) In the method of any of (1) to (5), the aggregating agent contained in the treatment liquid may be one or more of a cationic resin, an organic acid, and a polyvalent metal salt.

(7) In the method of any of (1) to (6), the second discharge nozzle group and the third discharge nozzle group each may have a portion overlapping the first discharge nozzle group when projected in the main scanning direction.

(8) In the method of any of (1) to (7), an area where a total adhesion amount of the treatment liquid to a total adhesion amount of the white ink and the non-white ink is from 5.0% by mass to 40.0% by mass may be formed on the recording medium.

(9) In the method of any of (1) to (8), in the white ink, a content of an organic solvent of polyols, having a normal boiling point of 280.0° C. or higher may be 1.0% by mass or less relative to an ink total amount, and in the non-white ink, a content of an organic solvent of polyols, having a normal boiling point of 280.0° or higher may be 1.0% by mass or less relative to an ink total amount.

(10) In the method of any of (1) to (9), the recording head may include a first nozzle array in which nozzles are arranged in the sub-scanning direction and are filled with the treatment liquid, a second nozzle array in which nozzles are arranged in the sub-scanning direction and are filled with the white ink, and a third nozzle array in which nozzles are arranged in the sub-scanning direction and are filled with the non-white ink, the first nozzle array may include the first discharge nozzle group, the second nozzle array may include the second discharge nozzle group and a non-discharge nozzle group which is a portion not used for recording, and the third nozzle array may include the third discharge nozzle group and a non-discharge nozzle group which is a portion not used for recording.

(11) In the method of any of (1) to (10), in the main scanning, the recording head may discharge the treatment liquid, the white ink while, and the non-white ink while moving in the main scanning direction.

(12) According to another aspect of the present disclosure, an ink jet recording apparatus performs recording by using the ink jet recording method of any of (1) to (11).

DESCRIPTION OF EXEMPLARY EMBODIMENTS

Figure 1:
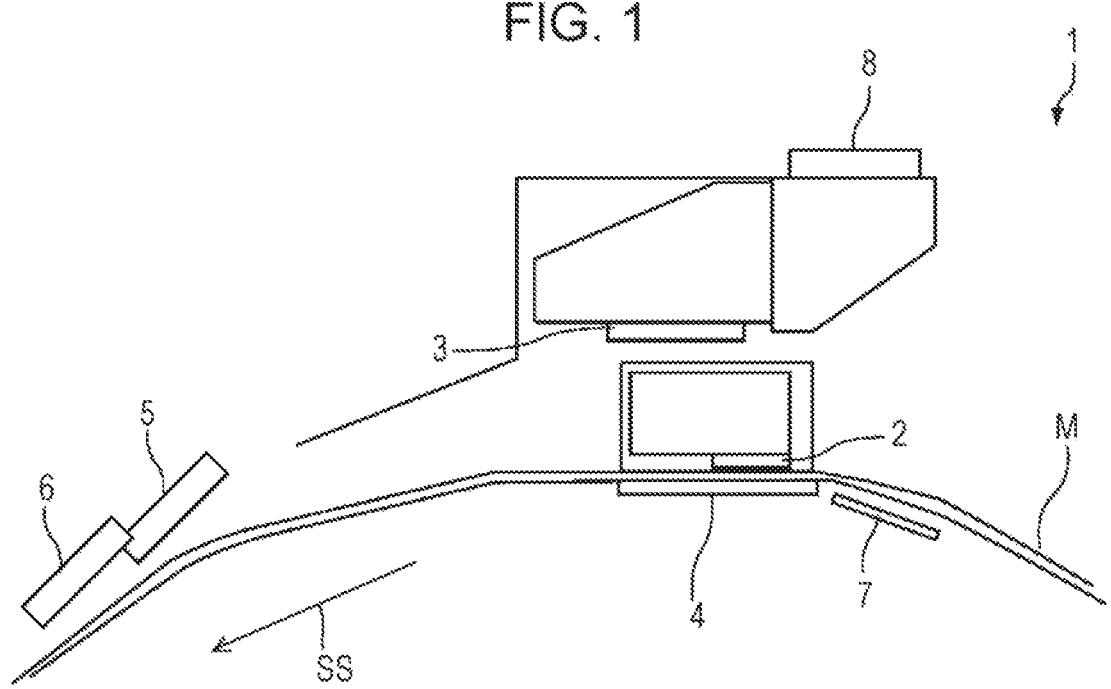
FIG. 1 is a schematic view of an example of an ink jet recording apparatus used in an ink jet recording method of an embodiment.

Hereinafter, embodiments of the present disclosure will be described. Embodiments described below illustrate an example of the present disclosure. The present disclosure is not limited to the following embodiments at all and also includes various modifications which are carried out within a range without changing the gist of the present disclosure. Not all of configurations described below are necessarily indispensable configurations to the present disclosure.

1. Ink Jet Recording Method

An ink jet recording method according to the present embodiment includes a treatment liquid adhesion step, a white ink adhesion step, and a non-white ink adhesion step. Also, the treatment liquid adhesion step, the white ink adhesion step, and the non-white ink adhesion step are performed by plural times of main scanning in which a recording head moves in a main scanning direction and plural times of sub-scanning in which the recording medium moves in a sub-scanning direction intersecting the main scanning direction. The recording head includes a first discharge nozzle group in which nozzles are arranged in the sub-scanning direction and discharge the treatment liquid, a second discharge nozzle group in which nozzles are arranged in the sub-scanning direction and discharge the white ink, and a third discharge nozzle group in which nozzles are arranged in the sub-scanning direction and discharge the non-white ink. The second discharge nozzle group and the third discharge nozzle group have portions that do not overlap each other when projected in the main scanning direction. One or both of the second discharge nozzle group and the third discharge nozzle group have a portion overlapping the first discharge nozzle group when projected in the main scanning direction.

Hereinafter, each adhesion step will be described first, and then the recording head and the like will be described.

1.1. Treatment Liquid Adhesion Step

The ink jet recording method of the present embodiment includes the treatment liquid adhesion step of causing a treatment liquid containing an aggregating agent to adhere to a recording medium.

1.1.1. Treatment Liquid

The treatment liquid contains the aggregating agent.

1.1.1.1. Aggregating Agent

The treatment liquid contains the aggregating agent aggregating a component of inks (the white ink and the non-white ink). The aggregating agent reacts with a component such as a pigment contained in the ink and resin particles that may be contained in the ink, and thus has an action of aggregating the pigment or the resin particles. However, a degree of aggregation of the pigment or resin particles by the aggregating agent varies depending on respective types of the aggregating agent, the pigment, and the resin particles, and can be controlled. In addition, the aggregating agent reacts with the pigment and the resin particles contained in the ink, and thus can aggregate a pigment and resin particles. According to this aggregation, for example, it is possible to enhance color development of a pigment, enhance fixability of resin particles, and/or increase viscosity of an ink.

The aggregating agent is not particularly limited, and examples thereof include a metal salt, an inorganic acid, an organic acid, and a cationic compound. As the cationic compound, a cationic resin (a cationic polymer), a cationic surfactant, and the like can be used. Among these, a polyvalent metal salt is preferable as the metal salt, and a cationic resin is preferable as the cationic compound. Therefore, as the aggregating agent, it is preferable to use any one of the cationic resin, the organic acid, and the polyvalent metal salt in that image quality, scratch resistance, gloss, and the like to be obtained are particularly excellent. In addition, when using the cationic polymer, it is particularly preferable in that cracks in an image to be formed are extremely hard to occur. In addition, plural kinds of the aggregating agent can be used in combination.

The metal salt is preferably the polyvalent metal salt, but metal salts other than the polyvalent metal salt can also be used. Among these aggregating agents, it is preferable to use at least one selected from the metal salt and the organic acid, from a viewpoint of excellent reactivity with a component contained in the ink.

The polyvalent metal salt is a compound formed of a divalent or higher valent metal ion and an anion. Examples of the divalent or higher valent metal ion include ions of calcium, magnesium, copper, nickel, zinc, barium, aluminum, titanium, strontium, chromium, cobalt, iron, and the like. Among the metal ions configuring the polyvalent metal salt, it is preferable to use at least one of the calcium ion and the magnesium ion, from a viewpoint of excellent aggregation property of a component of the ink.

Examples of the anion configuring the polyvalent metal salt include an inorganic ion or an organic ion. That is, the polyvalent metal salt in the present disclosure is formed of an inorganic ion or an organic ion and polyvalent metal. Examples of the inorganic ion include a chlorine ion, a bromine ion, an iodine ion, a nitrate ion, a sulfate ion, and a hydroxide ion. Examples of the organic ion include an organic acid ion, for example, a carboxylate ion.

The polyvalent metal compound is preferably an ionic polyvalent metal salt. In particular, when the polyvalent metal salt is a magnesium salt or a calcium salt, stability of the treatment liquid is further improved. In addition, as a counter ion of the polyvalent metal, any of an inorganic acid ion and an organic acid ion may be used.

Specific examples of the polyvalent metal salt include a calcium carbonate such as a heavy calcium carbonate and a light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, and aluminum acetate. One kind of these polyvalent metal salts may be used alone and two or more kinds thereof may be used in combination. Among these, since sufficient solubility in water can be secured and a making residue by the treatment liquid is reduced (marks are not noticeable), at least any one of the magnesium sulfate, the calcium nitrate, and the calcium chloride is preferable and the calcium nitrate is more preferable. These metal salts may have hydration water in a raw material form.

Examples of the metal salts other than the polyvalent metal salt include a monovalent metal salt such as a sodium salt and a potassium salt, for example, sodium sulfate and potassium sulfate.

Preferred examples of the organic acid include poly(meth) acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, or salts thereof. One kind of the organic acids may be used alone and two or more kinds thereof may be used in combination. The salts of the organic acids which are metal salts are included in the metal salts described above.

Preferred examples of the inorganic acid include sulfuric acid, hydrochloric acid, nitric acid, and phosphoric acid. One kind of the inorganic acids may be used alone and two or more kinds thereof may be used in combination.

Examples of the cationic resin (the cationic polymer) include cationic urethane resin, cationic olefin resin, cationic amine resin, and a cationic surfactant. The cationic polymer is preferably water soluble.

As the cationic urethane resin, a commercially available can be used. For example, HYDRAN CP-7010, CP-7020, CP-7030, CP-7040, CP-7050, CP-7060, and CP-7610 (trade name, manufactured by Dainippon Ink and Chemicals, Incorporated), SUPERFLEX 600, 610, 620, 630, 640, and 650 (trade name, Dai-ichi Kogyo Seiyaku Co., Ltd.), and Urethane Emulsion WBR-2120C and WBR-2122C (trade name, Taisei Fine Chemical Co., Ltd.) can be used.

The cationic olefin resin has an olefin such as ethylene or propylene in a structural skeleton, and a known one can be appropriately selected and used. In addition, the cationic olefin resin may be in a form of an emulsion dispersed in a solvent containing water, an organic solvent, and the like. As the cationic olefin resin, a commercially available product can be used, and examples thereof include ARROWBASE CB-1200 and CD-1200 (trade name, manufactured by UNITICA LTD).

The cationic amine resin may have an amino group in a skeleton, and a known one can be appropriately selected and used. Examples thereof include polyamine resin, polyamide resin, and polyallylamine resin. The polyamine resin is a resin having an amino group in a main skeleton of the resin. The polyamide resin is a resin having an amide group in a main skeleton of the resin. The polyallylamine resin is a resin having a structure derived from an allyl group in a main skeleton of the resin.

In addition, examples of the cationic polyamine resin can include UNISENCE KHE 103L manufactured by SENKA Corporation (hexamethylenediamine/epichlorohydrin resin, an aqueous solution having a 1% aqueous solution pH of approximately 5.0, viscosity of 20 to 50 (mPa·s), and a solid content concentration of 50% by mass) and UNISENCE KHE 104L (dimethylamine/epichlorohydrin resin, an aqueous solution having a 1% aqueous solution pH of approximately 7.0, viscosity of 1 to 10 (mPa·s), and a solid content concentration of 20% by mass). Furthermore, specific examples of the commercially available product of the cationic polyamine resin include FL-14 (manufactured by SNF group), ARAFIX 100, 251S, 255, and 255LOX (manufactured by Arakawa Chemical Industries, Ltd.), DK-6810, 6853, 6885; WS-4010, 4011, 4020, 4024, 4027, 4030 (manufactured by SEIKO PMC CORPORATION), PAPYOGEN P-105 (manufactured by SENKA Corporation), Sumirez Resin 650(30), 675A, 6615, SLX-1 (manufactured by Taoka Chemical Co., Ltd.), Catiomaster (registered trademark) PD-1, 7, 30, A, PDT-2, PE-10, PE-30, DT-EH, EPA-SK01, TMHMDA-E (manufactured by Yokkaichi Chemical Co., Ltd.), and JETFIX 36N, 38A, and 5052 (manufactured by Satoda Chemical Industrial Co., Ltd.).

Examples of the polyallylamine resin can include polyallylamine hydrochloride, polyallylamine amide sulfate, an allylamine hydrochloride•diallylamine hydrochloride copolymer, an allylamine acetate•diallylamine acetate copolymer, an allylamine acetate•diallylamine acetate copolymer, an allylamine hydrochloride•dimethylallylamine hydrochloride copolymer, an allylamine•dimethylallylamine copolymer, polydiallylamine hydrochloride, polymethyldiallylamine hydrochloride, polymethyldiallylamine amide sulfate, polymethyldiallylamine acetate, polydiallyl dimethyl ammonium chloride, a diallylamine acetate sulfur dioxide copolymer, a diallyl methyl ethyl ammonium ethyl sulfate sulfur dioxide copolymer, a methyl diallylamine hydrochloride•sulfur dioxide copolymer, a diallyldimethyl ammonium chloride•sulfur dioxide copolymer, and a diallyldimethyl ammonium chloride•acrylamide copolymer.

Examples of the cationic surfactant include primary, secondary, and tertiary amine salt compounds, an alkylamine salt, a dialkylamine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. Specific examples thereof include hydrochlorides or acetates of laurylamine, coconut amine, and rosin amine, lauryl trimethyl ammonium chloride, cetyltrimethylammonium chloride, benzyl tributylammonium chloride, benzalkonium chloride, dimethylethyl lauryl ammonium ethyl sulfate, dimethylethyl octyl ammonium ethyl sulfate, trimethyl lauryl ammonium hydrochloride, cetyl pyridinium chloride, cetyl pyridinium bromide, dihydroxyethyl laurylamine, decyldimethylbenzyl ammonium chloride, dodecyl dimethyl benzyl ammonium chloride, tetradecyldimethyl ammonium chloride, hexadecyldimethyl ammonium chloride, and octadecyl dimethyl ammonium chloride.

When at least one of the polyvalent metal salt, the organic acid, and the cationic resin is selected among these aggregating agents, an aggregation action is more favorable. Therefore, it is possible to form an image with higher quality. In addition, in particular, it is further preferable to select the cationic resin from a viewpoint of cracking prevention.

A total content of the aggregating agent in treatment liquid is, for example, from 0.1% by mass to 30.0% by mass, preferably from 0.5% by mass to 20.0% by mass, more preferably from 1.0% by mass to 20.0% by mass, and still more preferably from 2.0% by mass to 15.0% by mass, relative to total mass of the treatment liquid. Even when the aggregating agent is shared by a solution or a dispersion, the content is preferably in the above range in terms of a solid content. When the content of the aggregating agent is 0.1% by mass or more, a function of the aggregating agent to aggregate a component contained in the ink can be sufficiently obtained. In addition, when the content of the aggregating agent is 30.0% by mass or less, solubility or dispersibility of the aggregating agent in the treatment liquid becomes more favorable. Therefore, it is possible to improve storage stability and the like of the treatment liquid.

From a viewpoint that, even when the organic solvent contained in the treatment liquid has high hydrophobicity, the aggregating agent has a high solubility in the treatment liquid, it is preferable to use the aggregating agent of which solubility in 100 g of water at 25° C. is 1 g or more, and it is more preferable to use the aggregating agent of which the solubility is from 3 g to 80 g.

1.1.1.2. Other Components

The treatment liquid may contain a component such as a water soluble organic solvent, a surfactant, water, a resin particle, wax, an additive, a resin dispersant, preservative fungicide, a rust inhibitor, a chelating agent, a viscosity modifier, an antioxidant, and an anti-mold agent, in addition to the aggregating agent, as long as the function is not impaired. The other components described here can be used also for the white ink and the non-white ink, and will be described in this section, including cases where preferable selection, a mixing amount, and the like differ. The term simply described as "ink" refers to at least one of "the white ink and the non-white ink".

1.1.1.2. (1) Water Soluble Organic Solvent

The treatment liquid and the ink used in the ink jet recording method according to the present embodiment may contain the water soluble organic solvent. One of functions of the water soluble organic solvent is to improve wettability of the treatment liquid and the ink to the recording medium or enhance moisture retention of the treatment liquid and the ink. Examples of the water soluble organic solvent include esters, alkylene glycol ethers, cyclic esters, a nitrogen-containing solvent, and a polyhydric alcohol. Examples of the nitrogen-containing solvent can include cyclic amides and non-cyclic amides. Examples of the non-cyclic amides include alkoxyalkylamides.

When the treatment liquid and/or the ink contains the water soluble organic solvent, it is preferable to use the organic solvent having a normal boiling point of 280° C. or lower, preferably from 160° C. to 270° C., more preferably from 180° C. to 260° C., and still more preferably from 200° C. to 250° C. In this case, it is preferable in that scratch resistance, discharge stability, or the like is more excellent.

Examples of the esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Examples of the alkylene glycol ethers may include monoether or diether of alkylene glycol, and preferably include alkyl ether. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

In addition, in the alkylene glycol, diether is more preferable than the monoether in that when resin particles are contained in the ink, diether tends to dissolve or swell the resin particles more easily than monoether, and diether tends to improve scratch resistance of an image to be formed.

Examples of the cyclic esters can include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and a compounds in which a hydrogen of a methylene group adjacent to a carbonyl group thereof is substituted with an alkyl group having 1 to 4 carbon atoms.

Examples of the alkoxyalkylamides can include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N- dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the cyclic amides include lactams, for example, pyrrolidones such as 2-pyrrolidone, 1-methyl-2-pyrrolidone, 1-ethyl-2-pyrrolidone, 1-propyl-2-pyrrolidone, and 1-butyl-2-pyrrolidone. These are preferable from a viewpoint of solubility of the aggregating agent or acceleration of film formation of the resin particles to be preferable.

In addition, it is also preferable to use a compound represented by Formula (1) as the alkoxyalkylamides.

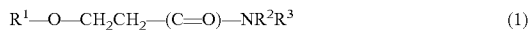

$$R^1\text{—O—}CH_2CH_2\text{—}(C\!\!=\!\!O)\text{—}NR^2R^3 \qquad (1)$$

In Formula (1), $R^1$ represents an alkyl group having 1 to 4 carbon atoms, $R^2$ and $R^3$ each independently represent a methyl group or an ethyl group. The "alkyl group having 1 to 4 carbon atoms" may be a linear or branched alkyl group, and examples thereof can include a methyl group, an ethyl group, an n-propyl group, an iso-propyl group, an n-butyl group, a sec-butyl group, an iso-butyl group, and a tert-butyl group. One kind of the compound represented by Formula (1) may be used alone and two or more kinds thereof may be used by being mixed.

Examples of a function of the compound represented by Formula (1) include enhancing the surface dryness and fixability of the treatment liquid or the ink adhering on the low-absorbent recording medium. In particular, the compound represented by Formula (1) is excellent in actions to soften and dissolve vinyl chloride resin moderately. Therefore, the compound represented by Formula (1) softens and dissolves a recording surface containing the vinyl chloride resin, and thus can cause the treatment liquid or the ink to penetrate into an inside of the low-absorbent recording medium. In this manner, when the treatment liquid or the ink penetrates into the low-absorbent recording medium, the ink is firmly fixed and it becomes easy to dry a surface of the ink. Accordingly, an image to be obtained tends to be excellent in surface dryness and fixability.

In addition, in Formula (1), $R^1$ is more preferably a methyl group having 1 carbon atom. In Formula (1), a normal boiling point of the compound in which $R^1$ is a methyl group is lower than a normal boiling point of a compound in which $R^1$ is an alkyl group having 2 to 4 carbon atoms. Therefore, when a compound in which $R^1$ is a methyl group in Formula (1) is used, the surface dryness of an adhesion region can further be improved in some cases.

A content when using the compound represented by Formula (1) is not particularly limited, and is approximately from 5% by mass to 50% by mass and preferably from 8% by mass to 48% by mass, relative to total mass of the treatment liquid or the ink. When the content of the compound represented by Formula (1) is within the above range, fixability and surface dryness of an image can be further improved in some cases.

From a viewpoint that an image to be formed is excellent in scratch resistance and the like, a content of the nitrogen-containing solvent in the treatment liquid and the ink is preferably from 1% by mass to 40% by mass, more preferably from 2% by mass to 30% by mass, still more preferably from 3% by mass to 25% by mass, even more preferably from 5% by mass to 23% by mass, further still more preferably from 7% by mass to 20% by mass, and particularly preferably from 11% by mass to 20% by mass.

Examples of the polyhydric alcohol include 1,2-alkanediol (for example, alkanediols such as ethylene glycol, propylene glycol (alias: propane-1,2-diol), 1,2-butanediol, 1,2-pentanediol, 1,2-hexanediol, 1,2-heptanediol, and 1,2-octanediol) and polyhydric alcohols (polyols) excluding the 1,2-alkanediol (for example, diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylol propane, and glycerin).

The polyhydric alcohols can be divided into alkanediols and polyols. The alkanediols are diols of an alkane having 5 or more carbon atoms. The carbon number of the alkane is preferably 5 to 15, more preferably 6 to 10, and still more preferably 6 to 8. The 1,2-alkanediol is preferable.

The polyols are polyols of alkane having 4 or less carbon atoms or intermolecular condensates of hydroxyl groups of polyols of alkane having 4 or less carbon atoms. The carbon number of the alkane is preferably 2 or 3. The number of the hydroxyl groups in a molecule of the polyols is 2 or more, preferably 5 or less, more preferably 3 or less. When the polyols are the intermolecular condensates, the number of intermolecular condensations is 2 or more, preferably 4 or less, and more preferably 3 or less. One kind of the polyhydric alcohols can be used alone and two or more kinds thereof can be used by being mixed.

The alkanediols and polyols can mainly function as a penetrating solvent and/or a moisturizing solvent. However, the alkanediols tend to have a strong property as the penetrating solvent, and polyols tend to have a strong property as the moisturizing solvent.

When the treatment liquid and the ink contain the water soluble organic solvent, the water soluble organic solvent may be used alone and two or more kinds thereof may be used in combination. In addition, a total content of the water soluble organic solvent is, for example, from 5% by mass to 50% by mass, preferably from 10% by mass to 45% by mass, more preferably from 15% by mass to 40% by mass, and still more preferably from 20% by mass to 35% by mass, relative to total mass of the treatment liquid or the ink. When the content of the water soluble organic solvent is within the range, a balance between wet-spreading property and dryness of the treatment liquid or the ink is more favorable. Furthermore, it is easy to form an image with high quality.

In the treatment liquid and the ink, a content of the organic solvent of polyols, which is a liquid under an environment at 25° C. and has a normal boiling point of 280.0° C. or higher, is preferably 5.0% by mass or less relative to the total mass. In addition, the content is more preferably 3.0% by mass or less, still more preferably 1.0% by mass or less, particularly preferably 0.5% by mass or less, and further still more preferably 0.3% by mass or less. A lower limit of the content is 0% by mass or more and the organic solvent may not be included. Accordingly, dryness of the treatment liquid or the ink adhering to the recording medium becomes favorable, and adhesion of the ink to the recording medium can be improved. Furthermore, in the treatment liquid and the ink, a content of the organic solvent of polyols, which is a liquid under an environment at 25° C., has a normal boiling point of 280.0° C. or higher, and is not limited to the polyols is still more preferably within the range, relative to the total mass. Examples of the organic solvent having the normal boiling point of 280° C. or higher include glycerin and polyethylene glycol monomethyl ether.

In addition, when the content of the organic solvent, which is a liquid under an environment at 25° C. and has the normal boiling point of 280.0° C. or higher, is in a level described above, particularly in a case where recording is performed to the low-absorbent recording medium or the non-absorbent recording medium, an effect of preventing an image from cracking becomes more remarkable.

From the viewpoint that an image to be formed is more excellent in scratch resistance, the content of the polyhydric alcohols in the treatment liquid or the ink is preferably from 1% by mass to 27% by mass, more preferably from 1.5% by mass to 15% by mass, and still more preferably from 2% by mass to 10% by mass.

1.1.1.2.(2) Surfactant

The treatment liquid and the ink may contain the surfactant. The surfactant has a function of reducing surface tension of the treatment liquid or the ink and improving the wettability with the recording medium or a base. Among the surfactants, for example, an acetylene glycol based surfactant, a silicone based surfactant, and a fluorine based surfactant can be preferably used.

The acetylene glycol based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, which are manufactured by Air Products and Chemicals. Inc.), OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all trade names, which are manufactured by Nisshin Chemical Industry Co., Ltd.), ACETYLENOL E00, E00P, E40, and E100 (all trade names, which are manufactured by Kawaken Fine Chemicals Co., Ltd.).

The silicone based surfactant is not particularly limited, and examples thereof preferably include a polysiloxane based compound. The polysiloxane based compound is not particularly limited, and examples thereof include a polyether-modified organosiloxane. Examples of a commercially available produce of the polyether-modified organosiloxane include BYK-306, BYK-307, BYK-333, BYK-341, BYK-345, BYK-346, and BYK-348 (all trade names, which are manufactured by BYK Japan KK.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

As the fluorine based surfactant, a fluorine-modified polymer is preferably used, and specific examples thereof include BYK-3440 (manufactured by BYK Japan KK.), SURFLON S-241, S-242, and S-243 (all trade names, manufactured by AGC SEIMI CHEMICAL CO., LTD.), and FTERGENT 215M (manufactured by NEOS COMPANY LIMITED).

When the treatment liquid or the ink contains the surfactant, plural kinds thereof may be contained. When the treatment liquid or the ink contains the surfactant, a content thereof is preferably from 0.1% by mass to 2.0% by mass, more preferably from 0.2% by mass to 1.5% by mass, and still more preferably from 0.3% by mass to 1.0% by mass, relative to total mass.

1.1.1.2.(3) Water

The treatment liquid and the ink used in the ink jet recording method according to the present embodiment may contain water. The treatment liquid and the ink are preferably water bases. The water basis is a composition containing water as one of the main solvent components. Water may be contained as a main solvent component, and is a component that evaporates and scatters by drying. It is preferable that the water is pure water such as ion exchanged water, ultrafiltered water, reverse osmosis water, and distilled water or water obtained by removing ionic impurities as much as possible, such as ultrapure water. In addition, when using water sterilized by ultraviolet irradiation, addition of hydrogen peroxide, or the like, in a case where the treatment liquid or the ink is preserved for a long time, it is possible to prevent fungi or bacteria from being generated, which is preferable. A content of the water is preferably 45% by mass or more, more preferably from 50% by mass to 98% by mass, and still more preferably from 55% by mass to 95% by mass, relative to a total amount of the treatment liquid or the ink.

1.1.1.2.(4) Additives

The treatment liquid and the ink may contain ureas, amines, saccharides, and the like, as additives. Examples of the ureas include urea, ethylene urea, tetramethyl urea, thiourea, 1,3-dimethyl-2-imidazolidinone, and betaines (such as trimethylglycine, triethylglycine, tripropylglycine, triisopropylglycine, N,N,N-trimethylalanine, N,N,N-triethylalanine, N,N,N-triisopropylalanine, N,N,N-trimethyl methyl alanine, carnitine, and acetyl carnitine).

Examples of the amines include diethanolamine, triethanolamine, and triisopropanolamine. The ureas or the amines may function as a pH adjuster.

Examples of the saccharides include glucose, mannose, fructose, ribose, xylose, arabinose, galactose, aldonic acid, glucitol (sorbitol), maltose, cellobiose, lactose, sucrose, trehalose, and maltotriose.

1.1.1.2.(5) Others

The treatment liquid and the ink used in the ink jet recording method according to the present embodiment may further contain a component such as preservative fungicide, a rust inhibitor, a chelating agent, a viscosity modifier, an antioxidant, and an anti-mold agent, as needed.

The treatment liquid may contain resin particles, wax, inorganic fine particles, and the like, as needed. However, since these components may cause aggregation or thickening, it is preferable not to contain these components.

1.1.2. Physical Properties of Treatment Liquid and Method of Causing Treatment Liquid to Adhere to Recording Medium In the treatment liquid, from a viewpoint of making wet spreading to the recording medium appropriate, a surface tension at 25.0° C. is 40.0 mN/m or less, preferably 38.0 mN/m or less, more preferably 35.0 mN/m or less, and still more preferably 30.0 mN/m or less.

In the ink jet recording method of the present embodiment, the treatment liquid adheres to the recording medium by the ink jet method. Therefore, viscosity of the treatment liquid at 20.0° C. is set to be preferably from 1.5 mPa·s to 15.0 mPa·s, more preferably from 1.5 mPa·s to 5.0 mPa·s, and still more preferably from 1.5 mPa·s to 3.6 mPa·s. When the treatment liquid adheres to the recording medium by the ink jet method, it is easy to efficiently form a predetermined treatment liquid adhesion region on the recording medium.

1.2. White Ink Adhesion Step

The white ink adhesion step is a step of causing the white ink to adhere to the recording medium by discharging the white ink from the recording head by the ink jet method.

1.2.1. White Ink

The white ink contains a white pigment.

1.2.1.1. White Pigment

Examples of the white pigment contained in the white ink include a metal compound such as metal oxide, barium sulfate, and calcium carbonate. Examples of the metal oxide include titanium dioxide, zinc oxide, silica, alumina, and magnesium oxide. In addition, in the white pigment, particles having a hollow structure may be used. As the particles having a hollow structure, known particles can be used. When the white ink contains inorganic fine particles to be described later, a material of the white pigment is preferably different from a material of the inorganic fine particles.

As the white pigment, among the examples described above, from a viewpoint of favorable whiteness and scratch resistance, it is preferable to use the titanium dioxide. One kind of the white pigment may be used alone and two or more kinds thereof may be used in combination.

A volume-based average particle diameter (D50) (also referred to as "volume average particle diameter") of the white pigment is set to be larger than a volume-average particle diameter of the inorganic fine particles to be described later. The volume average particle diameter of the white pigment is preferably from 30.0 nm to 600.0 nm, more preferably from 100.0 nm to 500.0 nm, and still more preferably from 150.0 nm to 400.0 nm. When the volume average particle diameter of the white pigment is within the range, the particles are difficult to settle and the dispersion stability can be improved. Also, when the white pigment is applied to an ink jet recording apparatus, it is possible to make clogging or the like of a nozzle difficult to occur. In addition, when the volume average particle diameter of the white pigment is within the range, a color density such as whiteness can be sufficiently satisfied.

The volume average particle diameter of the white pigment can be measured by a particle size distribution measuring apparatus based on a laser diffraction scattering method. Examples of the particle size distribution measuring apparatus include a particle size distribution analyzer (such as "Microtrac UPA" manufactured by Nikkiso Co., Ltd.) based on a dynamic light scattering method.

In the present specification, the term "white" when referring to the white ink, the white pigment, and the like does not refer to only perfect white, and includes a chromatic color, an achromatic color, or a glossy color, as long as the color can be visually recognized as white. More quantitatively, the "white" includes not only a color at $L^*=100$ in CIELAB, but also colors at $L^*$=from 80 to 100, and $a^*$ and $b^*=\pm10$ or less.

A content (solid content) of the white pigment in the white ink is preferably from 0.5% by mass to 20% by mass, preferably from 1% by mass to 20% by mass, more preferably from 5% by mass to 15% by mass, and still more preferably 7% by mass to 15% by mass, relative to total mass of the white ink. When the content of the white pigment is within the range, clogging or the like of a nozzle of the ink jet recording apparatus hardly occurs and a color density such as whiteness can be sufficiently satisfied.

It is preferable that the white pigment can be stably dispersed in water. Therefore, the white pigment may be dispersed by using a dispersing agent. As the dispersant, any of a surfactant, a resin dispersant, and the like may be used, and is selected from those which can make dispersion stability of the white pigment in the white ink favorable. In addition, the white pigment may be used as a self-dispersible pigment by, for example, oxidizing or sulfonating a surface of the pigment with ozone, hypochlorous acid, fuming sulfuric acid, or the like to modify the surface of the pigment particle.

Examples of a resin dispersant can include (meth)acrylic resin such as poly(meth)acrylic acid, a (meth)acrylic acid-acrylonitrile copolymer, a (meth)acrylic acid-(meth)acrylic acid ester copolymer, a vinyl acetate-(meth)acrylic acid ester copolymer, a vinyl acetate-(meth)acrylic acid copolymer, and a vinyl naphthalene-(meth)acrylic acid copolymer, and salts thereof; styrene resin such as a styrene-(meth)acrylic acid copolymer, a styrene-(meth)acrylic acid-(meth)acrylic acid ester copolymer, a styrene-α-methylstyrene-(meth) acrylic acid copolymer, a styrene-α-methylstyrene-(meth) acrylic acid-(meth)acrylic acid ester copolymer, a styrene-maleic acid copolymer, and a styrene-maleic anhydride copolymer, and salts thereof; an urethane resin, which is a polymer compound (resin) having an urethane bond in which an isocyanate group and a hydroxyl group are reacted and may be linear and/or branched regardless of a cross-linked structure, and salts thereof; polyvinyl alcohols; a vinylnaphthalene-maleic acid copolymer and salts thereof; a vinyl acetate-maleic acid ester copolymer and salts thereof; and aqueous resin such as a vinyl acetate-crotonic acid copolymer and salts thereof. Among these, a copolymer of a monomer having a hydrophobic functional group and a monomer having a hydrophilic functional group, and a polymer formed of monomers having both a hydrophobic functional group and a hydrophilic functional group are preferable. As a form of a copolymer, any form of a random copolymer, a block copolymer, an alternating copolymer, and a graft copolymer can be used.

Examples of a commercial product of the styrene resin dispersant include X-200, X-1, X-205, X-220, and X-228 (which are manufactured by SEIKO PMC CORPORATION), Nopcosperse (registered trademark) 6100 and 6110 (which are manufactured by SAN NOPCO LIMITED), Joncryl 67, 586, 611, 678, 680, 682, and 819 (which are manufactured by BASF Corporation), DISPER BYK-190 (manufactured by BYK Japan KK.), and N-EA137, N-EA157, N-EA167, N-EA177, N-EA197D, N-EA207D, and E-EN10 (which are manufactured by DKS Co. Ltd).

Examples of a commercially available product of the acrylic resin dispersant include BYK-187, BYK-190, BYK-191, BYK-194N, and BYK-199 (which are manufactured by BYK), and ARON A-210, A6114, AS-1100, AS-1800, A-30SL, A-7250, and CL-2 (which are manufactured by TOAGOSEI Co., Ltd.).

Furthermore, examples of a commercial product of the urethane resin dispersant include BYK-182, BYK-183, BYK-184, and BYK-185 (which are manufactured by BYK), TECO Disperse 710 (manufactured by Evonic Tego chemie GmbH), and Borchi (registered trademark) Gen 1350 (manufactured by OMG Borchers GmbH).

One kind of the dispersant may be used alone and two or more kinds thereof may be used in combination. A total content of the dispersant is preferably from 0.1 parts by mass to 30 parts by mass, more preferably from 0.5 parts by mass to 25 parts by mass, still more preferably from 1 part by mass to 20 parts by mass, and further still more preferably 1.5 parts by mass to 15 parts by mass, relative to 60 parts by mass of the white pigment. When the content of the dispersant is a lower limit or more of the range, it is possible to further enhance the dispersion stability of the white pigment. In addition, when the content of the dispersant is an upper limit or less of the range, it is possible to suppress viscosity of a dispersion to be obtained to be low.

Among the dispersants exemplified, the resin dispersants are preferable. In particular, at least one selected from the acrylic resin, the styrene resin, and the urethane resin is more preferable. Also, in this case, it is still more preferable that a weight average molecular weight of the dispersant is 500 or more. When using these resin dispersant as the dispersant, it is possible to make the dispersion stability of the white pigment still more favorable.

In addition, the white pigment itself may or may not have a property of being aggregated by the aggregating agent in the treatment liquid to be described later, and the property of being aggregated also depends on the dispersant. The pigment or the dispersant may be appropriately selected according to required aggregation property. The aggregation property of a coloring material such as the white pigment or the non-white pigment due to the aggregating agent can be adjusted by adjusting the amount of anionic groups on a surface of the pigment. Alternatively, when the pigment is dispersed using the resin, the aggregation property can be adjusted by adjusting a kind or a composition ratio of monomers used in synthesis of the resin. For example, it is possible to obtain the resin having high aggregation property by increasing the amount of the anionic groups of the coloring material or increasing an acid value of the resin. When performing adversely, it is possible to obtain a coloring material having low aggregation property. An ink is adjusted using the obtained coloring material in this manner, and a thickening ratio of the ink. Then, a coloring material capable of obtaining a desired thickening ratio of the ink may be selected and used for preparing an ink.

1.2.1.2. Other Components

The white ink may contain resin particles or wax, in addition to the white pigment.

1.2.1.2.(1) Resin Particles

The white ink may contain resin particles. The resin particles described here can be used also for the non-white ink, and will be described in this section, including cases where preferable selection, a mixing amount, and the like differ. The resin particles may be contained in the treatment liquid. However, since aggregation or thickening may occur in some cases, it is preferable not to be contained in the treatment liquid. Also in the following, the term simply described as "ink" refers to at least one of "the white ink and the non-white ink".

The resin particles can further improve adhesion of the image by the ink adhering to the recording medium. In addition, when the resin particles are difficult to be aggregated due to the treatment liquid, the resin particles can be more uniformly distributed in the adhesion area on the recording medium and it is possible to make unevenness of the image due to the ink small.

Examples of the resin particles include resin particles including urethane resin, acrylic resin, fluorene resin, polyolefin resin, rosin modified resin, terpene resin, polyester resin, polyamide resin, epoxy resin, vinyl chloride resin, a vinyl chloride-vinyl acetate copolymer, ethylene vinyl acetate resin, and the like. These resin particles are often handled in a form of an emulsion, and may be in a form of powder. In addition, one kind of the resin particles can be used alone and two or more kinds thereof can be used in combination.

The urethane resin is a generic term for resin having a urethane bond. As the urethane resin, polyether urethane resin having an ether bond in a main chain, a polyester urethane resin having an ester bond in a main chain, a polycarbonate urethane resin having a carbonate bond in a main chain, and the like may be used in addition to the urethane bond. As the urethane resin, a commercially available product may be used. For example, the urethane resin may be used by being selected from commercially available products such as SUPERFLEX 460, 460s, 840, E-4000 (trade name, manufactured by DKS Co., Ltd.), RESAMINE D-1060, D-2020, D-4080, D-4200, D-6300, D-6455 (trade name, manufactured by Dainichiseika Color & Chemicals Mfg. Co., Ltd.), TAKELAC WS-6021, W-512-A-6 (trade name, manufactured by Mitsui Chemicals & SKC Polyurethanes Inc.), Sancure 2710 (trade name, manufactured by LUBRIZOL Corporation), and PERMARIN UA-150 (trade name, manufactured by Sanyo Chemical Industries, Ltd.).

The acrylic resin is a generic term for a polymer obtained by polymerizing at least an acrylic monomer such as (meth)acrylic acid and (meth)acrylic acid ester, as one component. Examples thereof include resin obtained from acrylic monomers or a copolymer of an acrylic monomer and another monomer other than the acrylic monomer. Examples thereof include acryl-vinyl resin which is a copolymer of an acrylic monomer and a vinyl monomer. Furthermore, examples thereof include a copolymer with a vinyl monomer such as styrene.

As the acrylic monomer, acrylamide, acrylonitrile, and the like can also be used. As a resin emulsion using the acrylic resin as a raw material, a commercially available product may be used. For example, the resin emulsion may be used by being selected from FK-854 (trade name, manufactured by CHIRIKA. Co., ltd.), Movinyl 952B and 718A (trade name, manufactured by Nippon Synthetic Chemical Industry Co., Ltd.), Nipol LX852 and LX874 (trade name, manufactured by Zeon Corporation), and the like.

In the present specification, the acrylic resin may be styrene acrylic resin. In addition, in the present specification, an expression "(meth)acrylic" refers to at least one of acrylic and methacrylic.

The styrene acrylic resin is a copolymer obtained from a styrene monomer and an acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer. For the styrene acrylic resin, a commercially available product may be used. For example, the styrene acrylic resin may be used by being selected from Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (all trade names, manufactured by BASF Corporation), Movinyl 966A and 975N (trade names, manufactured by Nippon Synthetic Chemical Industry Co., Ltd.), and VINYBLAN 2586 (manufactured by Nisshin Chemical Industry Co., Ltd.)

The polyolefin resin has an olefin such as ethylene, propylene, or butylene in a structural skeleton, and a known polyolefin resin can be appropriately selected and used. As the olefin resin, a commercially available product can be used. For example, the olefin resin can be used by being selected from ARROWBASE CB-1200 and CD-1200 (trade names, manufactured by UNITICA LTD.).

In addition, the resin particles may be supplied in a form of an emulsion. Examples of a commercially available product of this resin emulsion include Microgel E-1002 and E-5002 (trade names, manufactured by NIPPONPAINT Co., Ltd., styrene-acryl resin emulsion), VONCOAT 4001 (trade name, manufactured by DIC Corporation, acrylic resin emulsion), VONCOAT 5454 (trade name, manufactured by DIC corporation, styrene-acrylic resin emulsion), Polysol AM-710, AM-920, AM-2300, AP-4735, AT-860, and PSASE-4210E (acrylic resin emulsion), Polysol AP-7020 (styrene•acrylic resin emulsion), Polysol SH-502 (vinyl acetate resin emulsion), Polysol AD-13, AD-2, AD-10, AD-96, AD-17, and AD-70 (ethylene•vinyl acetate resin emulsion), Polysol PSASE-6010 (trade name, ethylene vinyl acetate resin emulsion, and all trade names, manufactured by Showa Denko KK), Polysol SAE 1014 (trade name, styrene-acrylic resin emulsion, manufactured by Nippon Zeon Co., Ltd.), Saibinol SK-200 (trade name, acrylic resin emulsion, manufactured by Saiden Chemical Industry Co., Ltd.), AE-120A (trade name, manufactured by JSR Corporation, acrylic resin emulsion), AE 373D (trade name, manufactured by Etec Corporation, carboxy modified styrene acrylic resin emulsion), Seikadyne 1900 W (trade name, manufactured by Dainichiseika Color & Chemicals Mfg. Co., Ltd. ethylene vinyl acetate resin emulsion, VINYBLAN 2682 (acrylic resin emulsion), VINYBLAN 2886 (vinyl acetate acrylic resin emulsion), VINYBLAN 5202 (acetic acid acrylic resin emulsion) (trade names, which are manufactured by Nisshin Chemical Industry Co., Ltd.), Elitel KA-5071S, KT-8803, KT-9204, KT-8701, KT-8904, and KT-0507 (trade name, manufactured by Unitika Ltd., polyester resin emulsion), Hi-Tech SN-2002 (trade name, manufactured by TOHO CHEMICAL INDUSTRY Co., Ltd., polyester resin emulsion), TAKELAK W-6020, W-635, W-6061, W-605, W-635, and W-6021 (trade name, manufactured by Mitsui Chemicals & SKC Polyurethanes Inc., urethane resin emulsion), SUPERFLEX 870, 800, 150, 420, 460, 470, 610, and 700 (trade name, manufactured by DKS Co., Ltd., urethane resin emulsion), PERMARIN UA-150 (manufactured by Sanyo Chemical Industries, Ltd., urethane resin emulsion), Sancure 2710 (manufactured by Japanese Lubrizol Corporation, urethane resin emulsion), NeoRez R-9660, R-9637, and R-940 (manufactured by Kusumoto Chemicals, Ltd., urethane resin emulsion), ADEKA BONTIGHTER HUX-380 and 290K (manufactured by ADEKA Corporation, urethane resin emulsion), Movinyl 966A and Movinyl 7320 (manufactured by Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF Corporation), NK binder R-5HN (manufactured by Shin-Nakamura Chemical Co., Ltd), HYDRAN WLS-210 (non-crosslinkable polyurethane: manufactured by DIC Corporation), and Joncryl 7610 (manufactured by BASF Corporation). Any of these may be selected and used.

A glass transition temperature (Tg) of the resin particles is preferably from −50.0° C. to 200.0° C., more preferably from 0.0° C. to 150.0° C., and still more preferably from 50.0° C. to 100.0° C. When the glass transition temperature (Tg) of the resin particles is within the range, more excellent durability and clogging resistance tend to be obtained. The glass transition temperature is measured, for example, using a differential scanning calorimeter "DSC7000" (manufactured by Hitachi High-Tech Science Corporation.) in accordance with JIS K7121 (Testing Methods for Transition Temperatures of Plastics).

In addition, the Tg of the resin particles can be controlled by adjusting the type or the composition ratio of the monomers, focusing on an individual Tg of each monomer to be used at the time of resin polymerization. Accordingly, a Tg of the whole resin of the resin particles can be adjusted. In addition, it is also possible to mainly adjust an acid value of the resin by adjusting the type or the composition ratio of the monomers. Accordingly, it is possible to adjust reactivity between the resin particles and the treatment liquid. Then, the aggregation property of the ink can be adjusted in consideration of aggregation property of each substance such as resin particles, the white pigment, and the pigment dispersant or the aggregation property correlating with each other.

A volume average particle diameter of the resin particles is preferably from 10.0 nm to 300.0 nm, more preferably from 30.0 nm to 300.0 nm, still more preferably from 30.0 nm to 250.0 nm, and particularly preferably from 40.0 nm to 220.0 nm.

When the ink contains the resin particles, a content thereof is from 0.1% by mass to 20.0% by mass, preferably from 1.0% by mass to 15.0% by mass, and more preferably from 2.0% by mass to 10.0% by mass, relative to total mass of the ink, in terms of solid content.

1.2.1.2.(2) Wax

The white ink may contain wax. The wax described here can be used also for the non-white ink, and will be described in this section, including cases where preferable selection, a mixing amount, and the like differ. The wax may be contained in the treatment liquid. However, since aggregation or thickening may occur in some cases, it is preferable not to be contained in the treatment liquid. Since the wax has a function of imparting smoothness to an image by the ink, peeling of the image due to the ink can be reduced.

As a component forming the wax, one of plants animal waxes such as carnauba wax, Candelilla wax, beeswax, rice wax, and lanolin; petroleum waxes such as paraffin wax, microcrystalline wax, polyethylene wax, oxidized polyethylene wax, and petrolatum; mineral waxes such as montan wax and ozokerite; synthetic waxes such as carbon wax, Hoechst wax, polyolefin wax, and stearic acid amide; and emulsions of natural•synthetic waxes or compounded waxes such as an α-olefin•maleic anhydride copolymer can be used alone or plural kinds thereof can be used by being mixed. Among these, from a viewpoint of obtaining more excellent in an effect of enhancing the fixability to a soft packaging film, it is preferable to use the polyolefin wax (in particular, polyethylene wax and polypropylene wax) and the paraffin wax.

As the wax, a commercially available product can be used as it is. Examples thereof include NOPCOTE PEM-17 (trade name, manufactured by SAN NOPCO LIMITED), CHEMIPEARL W4005 (trade name, manufactured by Mitsui Chemicals, Inc.), and AQUACER 515, 539, and 593 (all trade names, and which are manufactured by BYK Japan KK.).

In addition, when the ink jet recording method includes a heating step, from a viewpoint of preventing the wax from being excessively melted and a performance thereof from being lowered, a melting point of the wax is preferably from 50.0° C. to 200.0° C., more preferably from 70.0° C. to 180.0° C., and still more preferably from 90.0° C. to 150.0° C.

The wax may be supplied in a form of an emulsion or a suspension. The content of the wax is preferably from 0.1% by mass to 10.0% by mass, more preferably from 0.5% by mass to 5.0% by mass, and still more preferably from 0.5% by mass to 2.0% by mass, relative to total mass of the ink, in terms of solid content. When the content of the wax is within the range, the function of the wax can be favorably exhibited. When one or both of the white ink and the non-white ink contain the wax, it is possible to sufficiently obtain the function of imparting smoothness to the image.

1.2.1.3. Other Components

The white ink may contain a component such as a water soluble organic solvent, a surfactant, water, an additive, inorganic fine particles, preservative fungicide, a rust inhibitor, a chelating agent, a viscosity modifier, an antioxidant, and an anti-mold agent. These components are the same as in the treatment liquid. Therefore, a description thereof will not be repeated.

1.2.2. Physical Properties of White Ink and Method of Causing White Ink to Adhere to Recording Medium When the white ink is mixed with the treatment liquid, components contained therein are aggregated by an action of the aggregating agent. In addition, when the white ink is mixed with the treatment liquid, viscosity thereof increases.

Here, regarding the increase of the viscosity of the ink when mixed with the treatment liquid, a "thickening ratio" is defined as follows. That is, the ink and the treatment liquid used in the ink jet recording method are mixed and stirred in a mass ratio of Ink:Treatment liquid=10:1 to determine a ratio of viscosity of a mixed liquid after mixing to viscosity of the ink before mixing, and this ratio is the thickening ratio. The viscosity is measured at 20° C. Thus, the thickening ratio is a magnification of the viscosity after mixing based on the viscosity before mixing. The thickening ratio is a value of approximately from 0.5 to 10.0. Depending on a composition of the ink or the treatment liquid, the thickening ratio may be less than 1.0 and the viscosity may be lowered. However, the term is referred to as the thickening ratio.

A lower limit of the thickening ratio of the white ink is preferably 1.0 or more, more preferably more than 1, still more preferably 1.1 or more, even more preferably 1.2 or more, particularly preferably 1.3 or more, and further still more preferably 1.4 or more. On the other hand, an upper limit of the thickening ratio of the white ink is preferably 10.0 or less, more preferably 3.0 or less, still more preferably 2.0 or less, even more preferably 1.8 or less, particularly preferably 1.5 or less, and further still more preferably 1.2 or less. When the thickening ratio of the white ink is in the range, it is preferable in that image quality, crack resistance, scratch resistance, discharge stability, or the like is more excellent.

The thickening ratio of the white ink can be adjusted by adjusting types and contents of the white pigment and the resin (the resin dispersant and/or resin particles) and the composition of the treatment liquid. That is, the thickening ratio can be confirmed by mixing the treatment liquid to be used and the prepared white ink. Based on this, the thickening ratio of the white ink can be adjusted.

The ink adheres to the recording medium by the ink jet method. Therefore, the viscosity of the ink at 20° C. before being thickened is preferably from 1.5 mPa·s to 15.0 mPa·s, more preferably from 1.5 mPa·s to 5.0 mPa·s, and still more preferably from 1.5 mPa·s to 3.6 mPa·s. Since the ink adheres to the recording medium by the ink jet method, it is easy to efficiently form a predetermined image on the recording medium.

In the ink to be used in the ink jet recording method of the present embodiment, from the viewpoint of making wet spreading to the recording medium appropriate, a surface tension at 25.0° C. is 40.0 mN/m or less, preferably 38.0 mN/m or less, more preferably 35.0 mN/m or less, and still more preferably 30.0 mN/m or less. The surface tension can be measured by confirming a surface tension when a platinum plate is wetted with a composition under an environment at 25.0° C., using an automatic surface tension meter CBVP-Z (manufactured by Kyowa Interface Science Co., LTD.).

1.3. Non-White Ink Adhesion Step

The non-white ink adhesion step is a step of causing the non-white ink to adhere to the recording medium by discharging the non-white ink from the recording head.

1.3.1. Non-White Ink

The non-white ink contains a non-white coloring material.

1.3.1.1. Non-White Coloring Material

The non-white coloring material contained in the non-white ink refers to a coloring material other than the white pigment. Examples of the non-white coloring material include a dye and pigment. For example, it is preferable that the non-white coloring material is a coloring material having a color such as cyan, yellow, magenta, or black.

The non-white coloring material may be either the dye or the pigment, or may be a mixture thereof. However, among the dye and the pigment, it is more preferable to contain the pigment. The pigment is excellent in storage stability such as light resistance, weather resistance, and gas resistance. Furthermore, from this viewpoint, the pigment is preferably an organic pigment.

Specifically, as the pigment, an azo pigment such as an insoluble azo pigment, a condensed azo pigment, an azo lake pigment, and a chelate azo pigment, a polycyclic pigment such as a phthalocyanine pigment, a perylene or perinone pigment, an anthraquinone pigment, a quinacridone pigment, a dioxane pigment, a thioindigo pigment, an isoindolinone pigment, and a quinophthalone pigment, a dye chelate, a dyed lake pigment, a nitro pigment, a nitroso pigment, an aniline black, a daylight fluorescent pigment, carbon black, or the like is used. One kind of the pigment may be used alone and two or more kinds thereof may be used in combination. Furthermore, as the non-white coloring material, a brilliant pigment may be used.

The pigment is not particularly limited, and specific examples thereof include the followings.

Examples of a black pigment include carbon blacks such as No. 2300, No. 900, MCF88, No. 33, No. 40, No. 45, No. 52, MA7, MA8, MA100, No. 2200B, and the like (all are manufactured by Mitsubishi Chemical Corporation), Raven 5750, Raven 5250, Raven 5000, Raven 3500, Raven 1255, Raven 700, and the like (all are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all are manufactured by CABOT JAPAN K.K.), and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all are manufactured by Degussa).

Examples of the yellow pigment include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta pigment include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. pigment violet 19, 23, 32, 33, 36, 38, 43, and 50.

Examples of the cyan pigment include C.I. pigment blue 1, 2, 3, 15, 15:1, 15:2, 15:3, 15:4, 16, 18, 22, 25, 60, 65, and 66, and C.I. bat blue 4 and 60.

The pigments other than the magenta, the cyan, and the yellow are not particularly limited, and examples thereof include C.I. pigment green 7 and 10, C.I. pigment brown 3, 5, 25, and 26, C.I. pigment orange 1, 2, 5, 7, 13, 14, 15, 16, 24, 34, 36, 38, 40, 43, and 63.

The pearl pigment is not particularly limited, and examples thereof include pigments having pearlescent or interference gloss, such as titanium dioxide coated mica, fish scale foil, and bismuth acid chloride.

The metallic pigment is not particularly limited, and examples thereof include particles including a simple substance or an alloy of aluminum, silver, gold, platinum, nickel, chromium, tin, zinc, indium, titanium, copper, and the like.

As the dye, for example, various dyes used for normal ink jet recording, such as a direct dye, an acidic dye, an edible dye, a basic dye, a reactive dye, a dispersion dye, a construction dye, a soluble construction dye, and a reaction dispersion dye can be used.

It is preferable that the non-white coloring material can be stably dispersed or dissolved in water. Therefore, the non-white coloring material may be dispersed by using a dispersing agent. Examples of the dispersant can include the same dispersant as used to improve the dispersibility of the white pigment of the white ink.

A content of the non-white coloring material is preferably from 0.3% by mass to 20.0% by mass, more preferably from 0.5% by mass to 15.0% by mass, still more preferably from 1% by mass to 10% by mass, and particularly preferably 2% by mass to 5% by mass, relative to total mass of the non-white ink. Although the non-white coloring material having high or low aggregation property, which is contained in the non-white ink can be used, from a viewpoint of obtaining more excellent resistance to bleeding, it is preferable to use the non-white coloring material having high aggregation property.

The thickening ratio of the non-white ink may be in the same range as the preferable thickening ratio of white ink. In addition, a lower limit of the thickening ratio of the non-white ink is preferably more than 1, more preferably 1.1 or more, still more preferably 1.2 or more, even more preferably 1.5 or more, further still more preferably 2 or more, and particularly preferably 3 or more. Also, an upper limit of the thickening ratio of the non-white ink is preferably 20.0 or less, more preferably 10.0 or less, still more preferably 7.0 or less, and particularly preferably 6.0 or less. Image recorded with the non-white ink are often images containing thin lines such as pictures or characters. Therefore, from a viewpoint of obtaining more excellent image quality, the thickening ratio of the non-white ink is preferably relatively high, preferably higher than that of the white ink, preferably higher than that of the white ink by 1 or more, and more preferably higher than that of the white ink by from 1.5 to 3.0.

A volume average particle diameter (before mixing with the treatment liquid) of the pigment particles when employing the pigment as the non-white coloring material is preferably from 10.0 nm to 200.0 nm, more preferably from 30.0 nm to 200.0 nm, still more preferably from 50.0 nm to 150.0 nm, and particularly preferably from 70.0 nm to 120.0 nm. The volume average particle diameter of the non-white coloring material is measured as an initial state by the method of confirming the volume average particle diameter described above. When the volume average particle diameter is in the range, it is preferable in points that it is easy to obtain a desired coloring material and it is likely to make the properties of the coloring material preferable.

1.3.1.2. Other Components

The non-white ink may further contain resin particles, a water soluble organic solvent, a surfactant, water, wax, an additive, a resin dispersant, preservative fungicide, a rust inhibitor, a chelating agent, a viscosity modifier, an antioxidant, and an anti-mold agent, in addition to the non-white coloring material. These components are all the same as described above. Therefore, a description thereof will not be repeated.

1.3.2. Physical Properties of Non-White Ink and Method of Causing Non-White Ink to Adhere to Recording Medium When the non-white ink is mixed with the treatment liquid, components contained therein are aggregated by an action of the aggregating agent. In addition, when the non-white ink is mixed with the treatment liquid, viscosity thereof increases.

The thickening ratio of the non-white ink can be adjusted by adjusting types and contents of the non-white coloring material and the resin (the resin dispersant and/or resin particles) and the composition of the treatment liquid. That is, the thickening ratio can be confirmed by mixing the treatment liquid to be used and the prepared non-white ink. Based on this, the thickening ratio of the non-white ink can be adjusted.

The non-white ink adheres to the recording medium by the ink jet method. Therefore, the viscosity of the non-white ink at 20° C. before being thickened is preferably from 1.5 mPa·s to 15.0 mPa·s, more preferably from 1.5 mPa·s to 7.0 mPa·s, and still more preferably from 1.5 mPa·s to 5.5 mPa·s. Since the non-white ink adheres to the recording medium by the ink jet method, it is easy to efficiently form a predetermined image on the recording medium.

In the non-white ink to be used in the ink jet recording method of the present embodiment, from the viewpoint of making wet spreading to the recording medium appropriate, a surface tension at 25.0° C. is 40.0 mN/m or less, preferably 38.0 mN/m or less, more preferably 35.0 mN/m or less, and still more preferably 30.0 mN/m or less. The surface tension is measured in the same manner as in the white ink.

1.4. Other Steps

The ink jet recording method of the present embodiment includes steps of causing the treatment liquid, the white ink, and the non-white ink to adhere to the recording medium, respectively. In addition, the ink jet recording method may further include a step of causing one or more kinds of the treatment liquid, the white ink, and the non-white ink to adhere to the recording medium, as needed. In this case, an order and the number of these steps are not limited, and these steps can be appropriately performed as needed. Furthermore, the ink jet recording method of the present embodiment may further include a drying step of drying a liquid adhering to the recording medium, a step of heating the recording medium (post-heating step), and the like.

1.4.1. Drying Step

The ink jet recording method of the present embodiment may include the drying step. The ink jet recording method according to the present embodiment may include a step of drying the recording medium before the adhesion step of the treatment liquid or the ink or during the adhesion step. The drying step is performed using a unit that stops recording and leaves it in that state, a unit (blowing type) that blows normal temperature air or warm air to the recording medium, a unit (radiation type) that irradiates the recording medium with radiation (such as infrared rays) generating heat, and a combination of two or more of the units. When a surface temperature of the recording medium is higher than the normal temperature by the drying step, the treatment liquid or the ink adheres to the recording medium having such a temperature, by the adhesion step.

The surface temperature of the recording medium at the time of adhesion of the treatment liquid or the ink is preferably 45° C. or lower, and more preferably from 20° C. to 45° C. Also, the surface temperature is preferably from 27.0° C. to 45° C., more preferably from 28° C. to 43° C., still more preferably from 30° C. to 40° C., and particularly preferably from 32° C. to 38° C. The temperature is a surface temperature of a portion of the recording face of the recording medium to which the ink adheres in the adhesion step, and is the highest temperature of the adhesion step in the recording area. When the surface temperature is in the range, it is more preferable in viewpoints of image quality, scratch resistance, clogging reduction, or high gloss.

The drying step can be performed simultaneously with one or more of the treatment liquid adhesion step, the white ink adhesion step, and the non-white ink adhesion step. When the drying step is performed simultaneously with the white ink adhesion step and the non-white ink adhesion step, the surface temperature of the recording medium is set to be preferably 43° C. or lower and more preferably 40° C. or lower.

1.4.2. Post-Heating Step

The ink jet recording method according to the present embodiment may further include the post-heating step of further heating the recording medium after the respective adhesion steps. The post-heating step can be performed using, for example, an appropriate heating unit. The post-heating process is performed, for example, by an after-heater (corresponding to a heating heater 5 is an example of the ink jet recording apparatus to be described later). In addition, the heating unit is not limited to the heating units provided in the ink jet recording apparatus, and another drying unit may also be used. Accordingly, since an obtained image can be more sufficiently fixed by drying, for example, it is possible to make recorded matter being in a usable state early.

In this case, the temperature of the recording medium is not particularly limited, and can be set in consideration of, for example, the Tg of the resin component forming the resin particles contained in the recorded matter. When considering the Tg of the resin component forming the resin particles or wax, the temperature may be set to 5.0° C. or higher, preferably 10.0° C. or higher than the Tg of the resin component forming the resin particles.

The temperature reached by heating in the post-heating step is from 30.0° C. to 120.0° C., preferably from 40.0° C. to 100.0° C., more preferably from 50.0° C. to 95° C., and still more preferably from 70° C. to 90° C. When the temperature of the recording medium is approximately in the range, film formation and planarization of the resin particles or the wax contained in the recorded matter can be performed, and the obtained image can be more sufficiently fixed by drying.

1.5. Recording Medium

The recording medium to which an image is formed by the ink jet recording method according to the present embodiment may have a recording face that absorbs liquid such as the ink and the treatment liquid or may not have the recording face that absorbs a liquid. Therefore, the recording medium is not particularly limited, and examples thereof include a liquid absorbent recording medium such as paper, a film, and cloth, a liquid low-absorbent recording medium such as printing paper, and a liquid non-absorbent recording medium such as metal, glass, and polymer. However, an excellent effect of the ink jet recording method of the present embodiment is more remarkable when recording an image on the liquid low-absorbent or liquid non-absorbent recording medium.

The liquid low-absorbent or liquid non-absorbent recording medium refers to a recording medium having a property of not absorbing or hardly absorbing the ink or the treatment liquid. Quantitatively, the liquid non-absorbent or liquid low-absorbent recording medium refers to "a recording medium of which water absorption amount from start of contact to 30 msec$^{1/2}$ in the Bristow method is 10 mL/m$^2$ or less". The Bristow method is most widely used as a method of measuring the liquid absorption amount in a short time, and is also employed in Japan Technical Association of Pulp and Paper Industry (JAPAN TAPPI). The details of the test method are described in Standard No. 51 "paper and cardboard, liquid absorption test method-Bristow method" of "JAPAN TAPPI Paper Pulp Test Method 2000 Edition". On the other hand, the liquid absorbent recording medium refers to a recording medium which does not correspond to the liquid non-absorbent and liquid low-absorbent recording media. In the present specification, expressions "liquid low-absorbent and liquid non-absorbent" may be referred to simply as "low-absorbent and non-absorbent".

Examples of the liquid non-absorbent recording medium include a recording medium obtained by coating a substrate such as paper with plastic, a recording medium obtained by bonding a plastic film onto a substrate such as paper, and a plastic film without an absorbent layer (a reception layer). Examples of the plastic stated here include polyvinyl chloride, polyethylene terephthalate, polycarbonate, polystyrene, polyurethane, polyethylene, and polypropylene.

In addition, examples of the liquid low-absorbent recording medium include a recording medium provided with a coating layer (a reception layer) configured to receive a liquid such as the ink or the treatment liquid on a surface. Examples of the recording medium when a substrate is the paper include printing paper such as art paper, coated paper, and matte paper. Examples of the recording medium when a substrate is the plastic film include a recording medium obtained by coating a surface of polyvinyl chloride, polyethylene terephthalate, polycarbonate, polystyrene, polyurethane, polyethylene, polypropylene, and the like with a hydrophilic polymer and the like and a recording medium obtained by coating the surface with particles of silica, titanium, and the like along with a binder.

The recording medium may be colorless and transparent, translucent, colored and transparent, chromatic opaque, achromatic opaque, and the like. Also, the recording medium itself may be colored, translucent, or transparent. In this case, when using the white ink as an ink for a background image, the white ink can function as a concealing layer that conceals a color of the recording medium itself. Also, for example, at the time of recording a color image, when the background image is recorded in advance on an area, to which a color image will be recorded, by the ink for a background image, it is possible to improve color development of the color image, in some cases.

1.6. Ink Jet Recording Apparatus

An example of an ink jet recording apparatus in which the ink jet recording method according to the present embodiment is performed will be described with reference to the drawings. In the ink jet recording apparatus in which the ink jet recording method according to the present embodiment is performed, the treatment liquid adhesion step, the white ink adhesion step, and the non-white ink adhesion step are performed by plural times of main scanning in which a recording head moves in a main scanning direction and plural times of sub-scanning in which the recording medium moves in a sub-scanning direction intersecting the main scanning direction. The recording head includes a first discharge nozzle group in which nozzles are arranged in the sub-scanning direction and discharge the treatment liquid, a second discharge nozzle group in which nozzles are arranged in the sub-scanning direction and discharge the white ink, and a third discharge nozzle group in which nozzles are arranged in the sub-scanning direction and discharge the non-white ink. The second discharge nozzle group and the third discharge nozzle group have portions that do not overlap each other when projected in the main scanning direction. One or both of the non-overlapping portions of the second discharge nozzle group and the third discharge nozzle group have a portion overlapping the first discharge nozzle group when projected in the main scanning direction.

Figure 2:
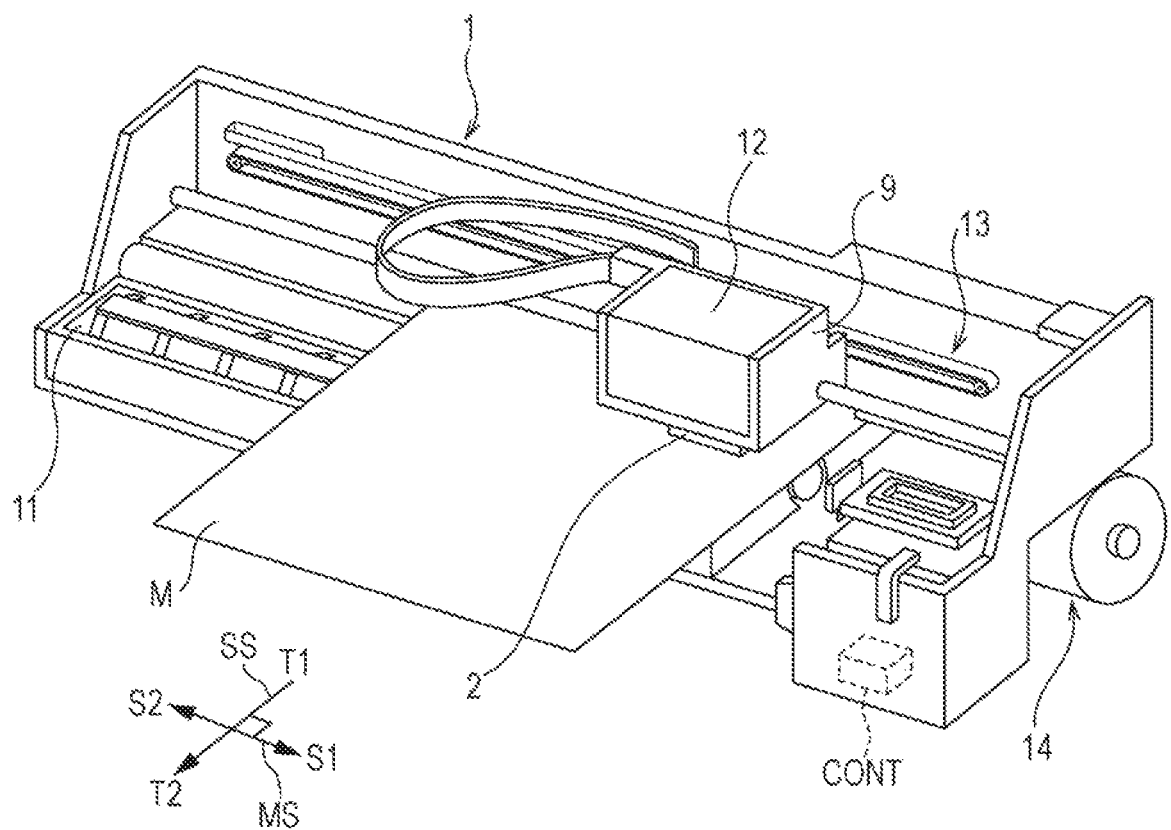
FIG. 2 is a schematic view of a periphery of a carriage of an example of an ink jet recording apparatus used in an ink jet recording method of an embodiment.

FIG. 1 is a schematic sectional view schematically showing an ink jet recording apparatus 1. FIG. 2 is a perspective view showing an example of a configuration of a periphery of the ink jet recording apparatus 1 in FIG. 1. As shown in FIGS. 1 and 2, the ink jet recording apparatus 1 includes a recording head 2, an IR heater 3, a platen heater 4, a heating heater 5, a cooling fan 6, a preheater 7, and a ventilation fan 8, a carriage 9, a platen 11, a carriage moving mechanism 13, a transporter 14, and a controller CONT. In the ink jet recording apparatus 1, the controller CONT shown in FIG. 2 controls operations of an entirety of the ink jet recording apparatus 1.

The recording head 2 is configured to perform recording on a recording medium M by discharging the ink and the treatment liquid from nozzles of the recording head 2 to adhere. In the present embodiment, the recording head 2 is a serial type recording head and the recording medium M is scanned multiple times in the main scanning direction with the recording head 2, and thus the ink and the treatment liquid adheres to the recording medium M. The recording head 2 is mounted on the carriage 9 shown in FIG. 2. The recording medium M is relatively scanned multiple times in the main scanning direction with the recording head 2, by an operation of the carriage moving mechanism 13 that moves the carriage 9 in a medium width direction of the recording medium M. The media width direction is the main scanning direction of the recording head 2. The scanning in the main scanning direction is also referred to as a main scanning.

Here, the main scanning direction is a direction in which the carriage 9 on which recording head 2 was mounted moves. In FIG. 1, the main scanning direction intersects the sub-scanning direction indicated by an arrow SS, which is a transport direction of the recording medium M. In FIG. 2, the width direction of the recording medium M, that is, the direction represented by S1-S2 is a main scanning direction MS, and a direction represented by T1-T2 is a sub-scanning direction SS. In one scanning, the scanning is performed in the main scanning direction, that is, in any one direction of the arrow S1 and the arrow S2. Then, the recording is performed on the recording medium M by repeating the main scanning of the recording head 2 and sub-scanning which is a transport of the recording medium M, plural times. That is, the treatment liquid adhesion step, the white ink adhesion step, and the non-white ink adhesion step are performed by plural times of the main scanning in which the recording head 2 moves in the main scanning direction and plural times of the sub-scanning in which the recording medium M moves in the sub-scanning direction intersecting the main scanning direction.

The cartridge 12 supplying the ink or the treatment liquid to the recording head 2 includes a plurality of independent cartridges. The cartridge 12 is detachably attached to the carriage 9 on which the recording head 2 is mounted. Each of the plurality of cartridges is filled with different types of ink or treatment liquid, and the cartridge 12 supplies the ink or the treatment liquid to each nozzle. In the present embodiment, the cartridge 12 is exemplified as being mounted on the carriage 9. However, the present disclosure is not limited thereto. The cartridge 12 may be provided at a location other than the carriage 9 and may be supplied to each nozzle using a supply tube (not shown).

For the discharge of the recording head 2, a known method of the related art can be used. In the present embodiment, a method of discharging a droplet using vibration of a piezoelectric element, that is, a discharge method of forming an ink droplet by mechanical deformation of an electrostrictive element is used.

The ink jet recording apparatus 1 includes the IR heater 3 and the platen heater 4 configured to heat the recording medium M when the ink or the treatment liquid is discharged from the recording head 2. In the present embodiment, when drying the recording medium M in the drying step, the IR heater 3 and the ventilation fan 8 (which is described later), or the like can be used.

When using the IR heater 3, the recording medium M can be heated by a radiation method by infrared radiation from a recording head 2 side. Accordingly, although the recording head 2 is also likely to be heated at the same time, the temperature can be raised without being affected by a thickness of the recording medium M, compared to a case of heating the recording medium M from a back surface thereof, as the platen heater 4. In addition, various kinds of fans (for example, the ventilation fan 8) that apply warm air or air having the same temperature as in an environment to the recording medium M to dry the ink of the treatment liquid on the recording medium M may also be provided.

The platen heater 4 can heat the recording medium M at a position facing the recording head 2 through the platen 11 such that the treatment liquid or the ink discharged by the recording head 2 can be dried early from the time when attached to the recording medium M. The platen heater 4 can conductively heat the recording medium M, and is used as needed in the ink jet recording method of the present embodiment as described above. When using the platen heater 4, it is preferable to control the surface temperature of the recording medium M to be 40.0° C. or lower.

An upper limit of the surface temperature of the recording medium M by the IR heater 3 and the platen heater is preferably 45.0° C. or lower, more preferably 40.0° C. or lower, still more preferably 38.0° C. or lower, and particularly preferably 35.0° C. or lower. Also, a lower limit of the surface temperature of the recording medium M is preferably 25.0° C. or higher, more preferably 28.0° C. or higher, still more preferably 30.0° C. or higher, and particularly preferably 32.0° C. or higher. Accordingly, it is possible to prevent the ink or the treatment liquid in the recording head 2 from being dried and compositional varying, and deposition of the ink or the resin on an inner wall of the recording head 2 is suppressed. In addition, it is possible to fix the ink or the treatment liquid early on recording medium M, and it is possible to improve the image quality.

The heating heater 5 is a heater that dries and solidifies the ink adhering to the recording medium M, that is, a heater for secondary heating or secondary drying. The heating heater 5 can be used in the post-heating step. When the heating heater 5 heats the recording medium M on which the image was recorded, water contained in the ink is more quickly evaporated and scattered, and an ink film is formed by the resin contained in the ink. In this manner, the ink film is firmly fixed or bonded on the recording medium M. Accordingly, an excellent film forming property is obtained and an excellent image with high quality can be obtained in a short time. An upper limit of the surface temperature of the recording medium M by the heating heater 5 is preferably 120.0° C. or lower, more preferably 100.0° C. or lower, and still more preferably 90.0° C. or lower. Also, a lower limit of the surface temperature of the recording medium M is preferably 60.0° C. or higher, more preferably 70.0° C. or higher, and still more preferably 75.0° C. or higher. When the temperature is in the range, an image with high quality can be obtained in a short time.

The ink jet recording apparatus 1 may further include the cooling fan 6. When the ink recorded on recording medium M is dried and then the ink on the recording medium M is cooled by the cooling fan 6, an ink coating film can be formed on recording medium M with good adhesion.

In addition, the ink jet recording apparatus 1 may further include the preheater 7 which preheats the recording medium M before the ink adheres to the recording medium M. Furthermore, the ink jet recording apparatus 1 may further include the ventilation fan 8 such that the ink of the treatment liquid adhering to the recording medium M is more efficiently dried.

The ink jet recording apparatus includes the platen supporting the recording medium M, the carriage moving mechanism 13 moving the carriage 9 relative to the recording medium M, and the transporter 14 which is a roller for transporting the recording medium M in the sub-scanning direction, below the carriage 9. Operations of the carriage moving mechanism 13 and the transporter 14 are controlled by the controller CONT.

Figure 3:
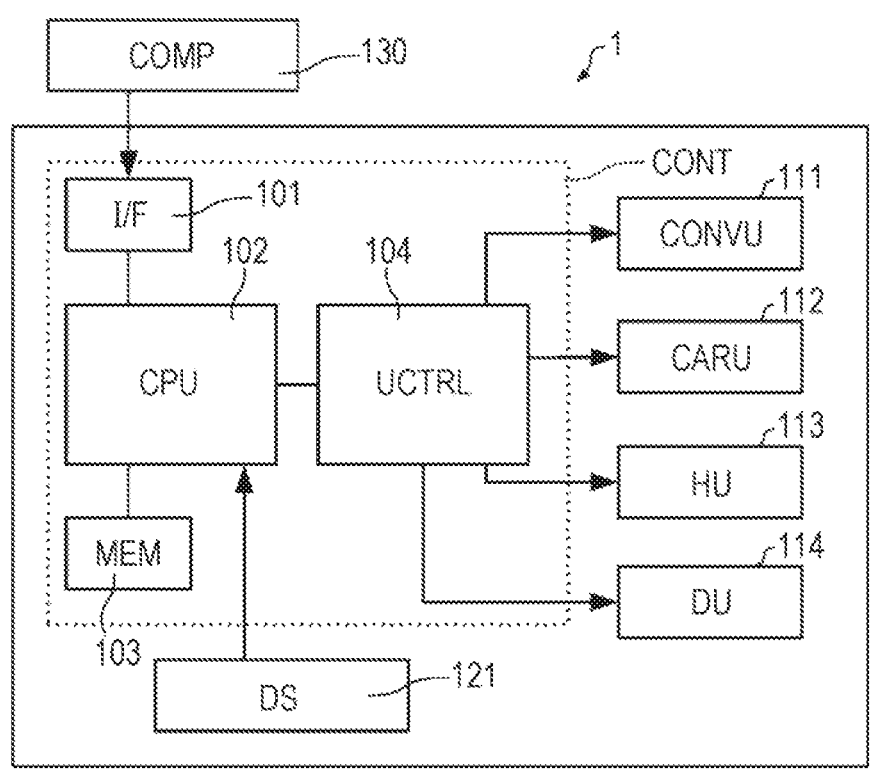
FIG. 3 is a block diagram of an example of an ink jet recording apparatus used in an ink jet recording method of an embodiment.

FIG. 3 is a functional block diagram of the ink jet recording apparatus 1. The controller CONT is a control unit configured to control the ink jet recording apparatus 1. An interface unit 101 (I/F) transmits and receives data between a computer 130 (COMP) and the ink jet recording apparatus 1. A CPU 102 is an arithmetic processing unit configured to control the entire ink jet recording apparatus 1. A memory 103 (MEM) secures an area storing a program of the CPU 102, a working area, or the like. The CPU 102 controls each unit by a unit control circuit 104 (UCTRL). A detector group 121 (DS) monitors a status in the ink jet recording apparatus 1, and the controller CONT controls each unit based on the detection result.

A transport unit 111 (CONVU) controls the sub-scanning (transport) of the ink jet recording, and specifically controls a transport direction and a transport speed of the recording medium M. Specifically, the transport direction and the transport speed of the recording medium M are controlled by controlling a rotating direction and a rotational speed of the transport roller driven by a motor.

A carriage unit 112 (CARU) controls the main scanning (pass) of the ink jet recording, and specifically, reciprocates the recording head 2 in the main scanning direction. The carriage unit 112 includes the carriage 9 on which the recording head 2 is mounted and the carriage moving mechanism 13 configured to reciprocate the carriage 9.

A head unit 113 (HU) controls a discharge amount of the treatment liquid or the ink from the nozzle of the recording head 2. For example, when the nozzles of the recording head 2 are driven by the piezoelectric element, the head unit 113 controls an operation of the piezoelectric element in each nozzle. The head unit 113 controls a timing of adhesion of each ink, a dot size of the ink or the treatment liquid, and the like. In addition, the adhesion amount of the treatment liquid or the ink per scan is controlled by combining the controls of the carriage unit 112 and the head unit 113.

A drying unit 114 (DU) controls the temperatures of various heaters such as the IR heater 3, the preheater 7, the platen heater 4, and the heating heater 5.

The ink jet recording apparatus 1 alternately repeats the operation of moving the carriage 9 on which the recording head 2 is mounted in the main scanning direction and the transport operation (sub-scanning). In this case, when performing each pass, the controller CONT controls the carriage unit 112 to move the recording head 2 in the main scanning direction, and controls the head unit 113 to discharge droplets of the treatment liquid or the ink from a predetermined nozzle hole of the recording head 2 to cause the droplets of the treatment liquid or the ink to adhere to the recording medium M. In addition, the controller CONT controls the transport unit 111 to transport the recording medium M in the transport direction by a predetermined transport amount (feeding amount) at the time of the transport operation.

In the ink jet recording apparatus 1, the recording area to which a plurality of droplets adhered is gradually transported by repeating the main scanning (pass) and the sub-scanning (transport operation). Then, the droplets adhering to the recording medium M are dried by the after-heater 5 to complete the image. Thereafter, the completed recorded matter may be wound by a winding mechanism or transported by a flat bed mechanism.

An arrangement of nozzle arrays of a nozzle face in the recording head 2 of the ink jet recording apparatus used for the ink jet recording method of the present embodiment will be described. Examples of the arrangement of the nozzle arrays of the nozzle face can include as follows. There are the first discharge nozzle group in which nozzles are arranged in the sub-scanning direction and discharge the treatment liquid, the second discharge nozzle group in which nozzles are arranged in the sub-scanning direction and discharge the white ink, and the third discharge nozzle group in which nozzles are arranged in the sub-scanning direction and discharge the non-white ink. The second discharge nozzle group and the third discharge nozzle group have portions that do not overlap each other when projected in the main scanning direction. One or both of the second discharge nozzle group and the third discharge nozzle group have a portion overlapping the first discharge nozzle group when projected in the main scanning direction. Preferably, one or both of the non-overlapping portions of the second discharge nozzle group and the third discharge nozzle group have a portion overlapping the first discharge nozzle group when projected in the main scanning direction.

Figure 4:
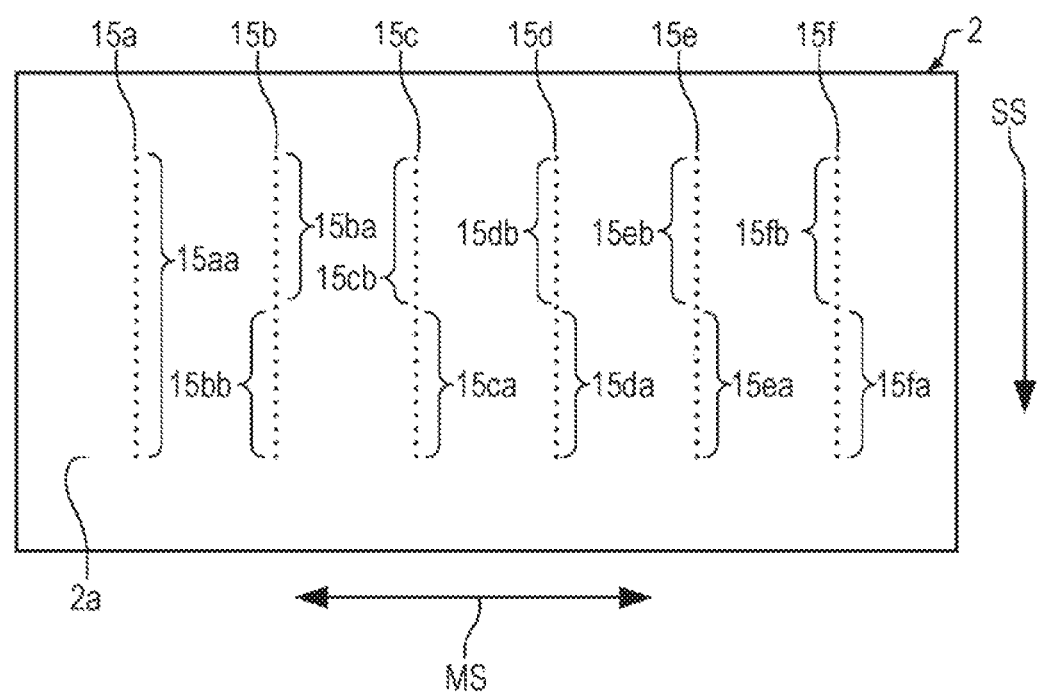
FIG. 4 is a schematic plan view of an example of a nozzle face of a recording head of an ink jet recording apparatus used in an ink jet recording method of an embodiment.

FIG. 4 schematically shows an example of an arrangement of nozzle arrays of a nozzle face 2a in the recording head 2. The recording head 2 has a nozzle face 2a in which a plurality of nozzles are formed. In the example shown in FIG. 4, in the nozzle face 2a of the recording head 2, a plurality of nozzle arrays 15a, 15b, 15c, 15d, 15e, and 15f in which a plurality of nozzles are arranged in the sub-scanning direction SS are formed. More nozzle arrays may further be provided. In FIG. 4, MS indicates the main scanning direction.

In the ink jet recording method of the present embodiment, when using the recording head 2 having the arrangement of the nozzle arrays exemplified in FIG. 4, for example, the nozzle array 15a, the nozzle array 15b, and the nozzle arrays 15c to 15f can be respectively filled with the treatment liquid, the white ink, and non-white ink and used. Any number of the nozzle arrays or any order of filling ink or the like may be adopted, and these can be designed as appropriate.

In the example shown in FIG. 4, positions of the nozzle arrays 15a to 15f, in the sub-scanning direction SS overlap each other. The nozzle arrays 15a to 15f may have portions in which positions in the sub-scanning direction SS overlap each other. In other words, the nozzle arrays 15a to 15f are arranged to overlap each other when projected in the main scanning direction MS.

Here, the recording head 2 can be controlled to perform recording by using each nozzle group including some nozzles, in each nozzle array. That is, each nozzle array can be selected to have a discharge nozzle group and a non-discharge nozzle group. Such selection can be performed, for example, in a manner that a user inputs a selection result to the controller CONT. In addition, a menu relating to the arrangement of the discharge nozzle group and the non-discharge nozzle group of each nozzle array is stored in advance in the memory 103 or the like, and the user may select the menu. Hereinafter, a set of nozzles used for recording in each nozzle array is referred to as a discharge nozzle group. Also, a set of nozzles not used for recording in each nozzle array is referred to as a non-discharge nozzle group. The discharge nozzle group is a set of nozzles which are used for recording, and are set to perform a discharge at the time of recording. In a case of such nozzles, a nozzle in which a discharge failure occurred due to an unintended defect of the nozzle during recording is also included in the discharge nozzle group. In addition, the non-discharge nozzle group is a set of nozzles which are not used for recording, and are set not to perform a discharge at the time of recording. In such nozzles, a nozzle that performs a discharge for a purpose other than image formation, such as a maintenance purpose is also included in the non-discharge nozzle group.

In the example of FIG. 4, the nozzle array 15a which is filled with the treatment liquid includes no non-discharge nozzle group and only includes a discharge nozzle group 15aa (the first discharge nozzle group) in entirety. In addition, the nozzle array 15b which is filled with the white ink includes a discharge nozzle group 15ba (the second discharge nozzle group) and a non-discharge nozzle group 15bb. The nozzle arrays 15c to 15f which are filled with the non-white ink respectively include discharge nozzle groups 15ca to 15fa (the third discharge nozzle groups) and non-discharge nozzle groups 15cb to 15fb.

Also, as shown in the example of FIG. 4, a portion of the second discharge nozzle group, not overlapping the third discharge nozzle groups when projected in the main scanning direction, and portions of the third discharge nozzle groups, not overlapping the second discharge nozzle group when projected in the main scanning direction may have a portion overlapping the first discharge nozzle group when respectively projected in the main scanning direction. In this manner, the white ink and the non-white ink can be ejected at the same time with the treatment liquid.

When two or more discharge nozzle groups of different nozzle arrays are arranged to overlap each other when projected in the main scanning direction MS, a liquid discharged from each nozzle array can adhere to the same area of the recording medium in one main scan (pass). A form of such adhesion is referred to as a simultaneous ejection.

The simultaneous ejection in this case not only refers to a discharge of two or more kinds of liquid strictly simultaneously, but also includes a discharge of two or more kinds of liquid to the same recording area in one main scanning. For example, the recording head may discharge the treatment liquid, the white ink, and the non-white ink while moving in the main scanning direction to perform the main scanning.

Also, when the discharge nozzle group is provided on an upstream in the sub-scanning direction SS in which the recording medium M is transported, the liquid discharged from the nozzle group can adhere to the recording medium M first. For example, in the ink jet recording method of the present embodiment, when the discharge nozzle group is disposed on the upstream in the transport direction of the recording medium in the sub-scanning direction, the ink or the like to be discharged from the discharge nozzle group can adhere to the recording medium M first.

In the example of FIG. 4, the discharge nozzle group 15ba (the second discharge nozzle group) of the nozzle array 15b and the discharge nozzle groups 15ca to 15fa (the third discharge nozzle groups) of the nozzle arrays 15c to 15f do not overlap each other when projected in the main scanning direction, and the discharge nozzle group 15ba (the second discharge nozzle group) of the nozzle array 15b is provided on the upstream in the sub-scanning direction SS. Therefore, the white ink will adhere to the recording medium M before the non-white ink.

In addition, a reverse arrangement is also possible. Although not shown, in the ink jet recording method of the present embodiment, when the non-discharge nozzle groups 15cb to 15fb of the nozzle arrays 15c to 15f (the third nozzle arrays) are used as discharge nozzle groups and the non-discharge nozzle group 15bb of the nozzle array 15b (the second nozzle array) is used as a discharge nozzle group, these do not overlap each other when projected in the main scanning direction, and the discharge nozzle groups of the third nozzle arrays are disposed upstream of the discharge nozzle group of the second nozzle array in the transport direction of the recording medium in the sub-scanning direction. Accordingly, the non-white ink can adhere to the recording medium first.

Also, although not shown, it is possible to be adopted that the first nozzle array 15a may have the discharge nozzle group 15aa and a non-discharge nozzle group 15ab, and one of the discharge nozzle group of the second nozzle array and the discharge nozzle group of the third nozzle array may overlap the discharge nozzle group of the first nozzle array when projected in the sub-scanning direction.

In the arrangement example shown in FIG. 4, the inks discharged from nozzle arrays having no portion in which positions in the sub-scanning direction overlap each other do not adhere to the same area on the recording medium in the same main scanning. For example, in a main scanning, the white ink with which the nozzle array 15b is filled adheres to a certain area. Then, in another main scanning, the non-white ink with which the nozzle arrays 15c to 15f are filled can adhere to the area. Here, in a main scanning, for example, an area in which the white ink adheres to the recording medium is an area of the recording medium that the discharge nozzle group of the white ink faces in the main scanning.

In this manner, the white ink with which the nozzle array 15b is filled and the non-white ink with which the nozzle arrays 15c to 15f are filled adhere to each other at the same area after time longer than one main scanning time elapsed after adhering to the recording medium M. Accordingly, mixing of colors between the inks on the recording medium M is hard to occur, which is preferable.

Also, in the arrangement of the discharge nozzle groups shown in FIG. 4, the transport amount (feed amount) of the recording medium M to the sub-scanning direction SS in the sub-scanning can be set to be equal to or shorter than a length of the discharge nozzle group in the sub-scanning direction SS. For example, when white ink adheres to the recording area of the recording medium M in eight times of main scanning (8 passes), the transport amount (feed amount) of the recording medium M to the sub-scanning direction SS in sub-scanning may be ⅛ of a length of the discharge nozzle group of the white ink in the sub-scanning direction SS. However, when the feed amount of the recording medium M decreases, a recording speed decreases, but it is easy to form an image with higher quality.

In addition to the example shown in FIG. 4, in any nozzle array, discharge nozzle groups can be disposed separately and independently at any position. Also, an overlap of the nozzle arrays when projected in the main scanning direction MS may be designed to reduce the number of non-discharge nozzle groups, for example. Furthermore, for each nozzle group, lengths and the number of the discharge nozzle groups and the non-discharge nozzle groups in the nozzle array can be independently appropriately designed.

Figure 5:
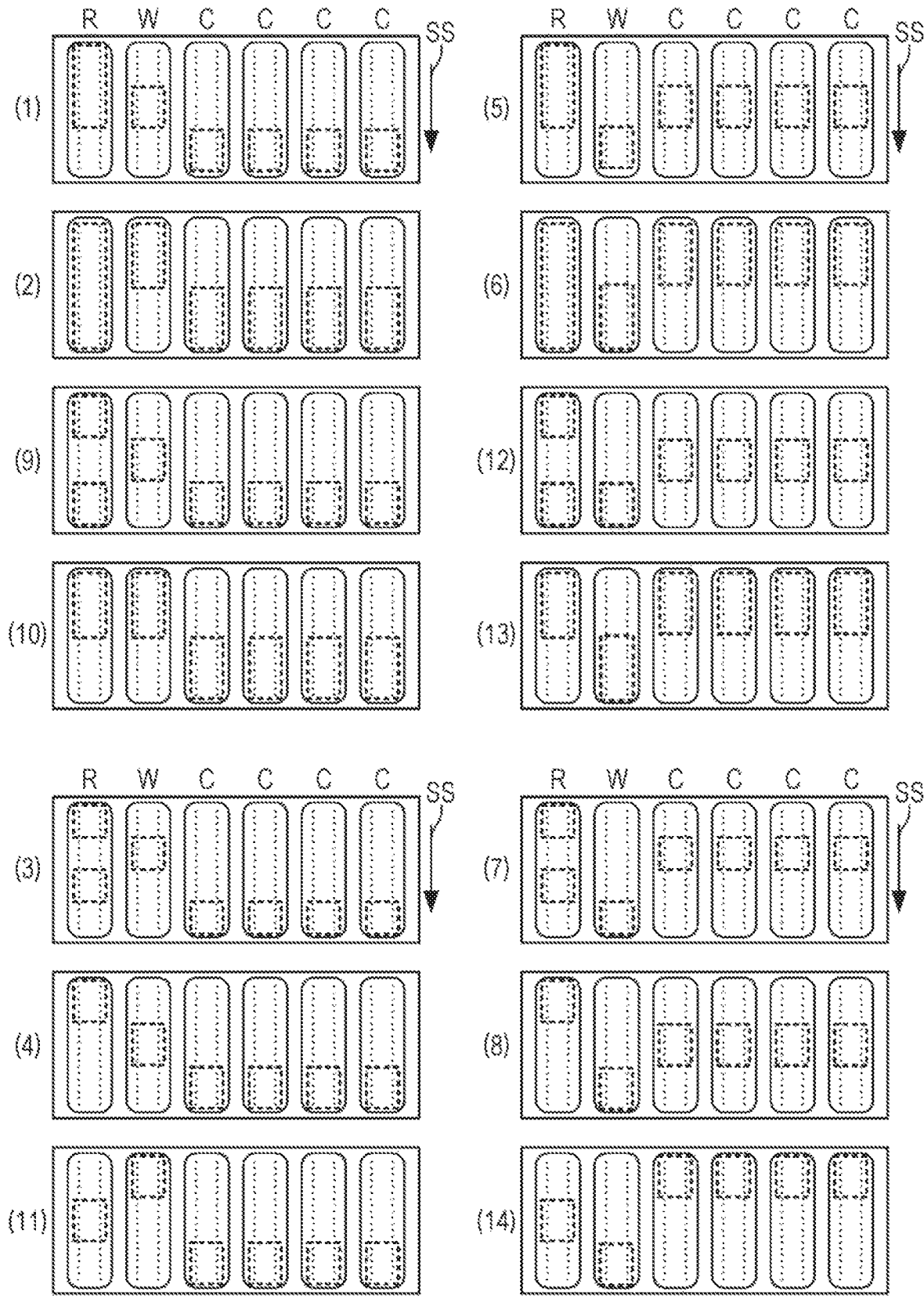
FIG. 5 is a schematic view showing arrangement examples of discharge nozzle groups for realizing a recording method according to an embodiment.

FIG. 5 is a schematic view showing an example of an arrangement of discharge nozzle groups of the recording head. In FIG. 5, numbers shown in parentheses are numbers of arrangement examples of the discharge nozzle groups. In FIG. 5, an area enclosed by a broken line is the discharge nozzle group of each nozzle array. Also, R, W, and C correspond to nozzle arrays filled with respectively the treatment liquid, the white ink, and the non-white ink. Also, "SS" indicates the sub-scanning direction, and indicates that the recording medium M is transported along an arrow direction. A horizontal direction of FIG. 5 is the main scanning direction.

In FIG. 5, a nozzle array corresponding to each liquid is an example in which although there are two rows, nozzles of one row and nozzles of another row are arranged in a form in which the nozzles of the other row are alternately positioned between the nozzles of the one row when projected in the main scanning direction, and thus the one row and the other row each have a nozzle density of 360 dpi, but both together form one nozzle array having a nozzle density of 720 dpi.

For example, FIG. 5 shows an arrangement example of nozzle groups, in which a portion surrounded by a dotted line is used as a discharge nozzle group, and a portion other than the portion surrounded by a dotted line is used as a non-discharge nozzle group, in each nozzle array (R, W, or C). Although four rows of a C nozzle array are arranged in the main scanning direction, the number of rows of the C nozzle array is not limited thereto, and may be one or more. In this example, an R nozzle array (the first nozzle array) is filled with the treatment liquid, a W nozzle array (the second nozzle array) is filled with the white ink, and the C nozzle array (the third nozzle array) is filled with the non-white ink.

Arrangement Examples (1), (2), (5), (6), (9), (10), (12), and (13) are examples in which the second discharge nozzle group and the third discharge nozzle group have portions that do not overlap each other when projected in the main scanning direction, and one or both of the second discharge nozzle group and the third discharge nozzle group have a portion overlapping the first discharge nozzle group when projected in the main scanning direction.

On the other hand, Arrangement Examples (3), (4), (7), (8), (11), and (14) are examples in which the second discharge nozzle group and the third discharge nozzle group have the portions that do not overlap each other when projected in the main scanning direction, and both the second discharge nozzle group and the third discharge nozzle group have no portion overlapping the first discharge nozzle group when projected in the main scanning direction.

In the ink jet recording apparatus 1, the recording method of the present embodiment is realized by the controller CONT controlling the arrangement of discharge nozzle groups in the nozzle array, but may be realized by designing the arrangement of the nozzle array itself to match a predetermined discharge nozzle group. In this case, for example, in FIG. 4, each nozzle array is provided in advance in the recording apparatus as an arrangement of nozzle arrays having only the discharge nozzle group of FIG. and having no non-discharge nozzle group. Also in this case, the recording method of the present embodiment can be performed using the discharge nozzle group, by providing such a nozzle array to the recording apparatus in advance.

Figure 6:
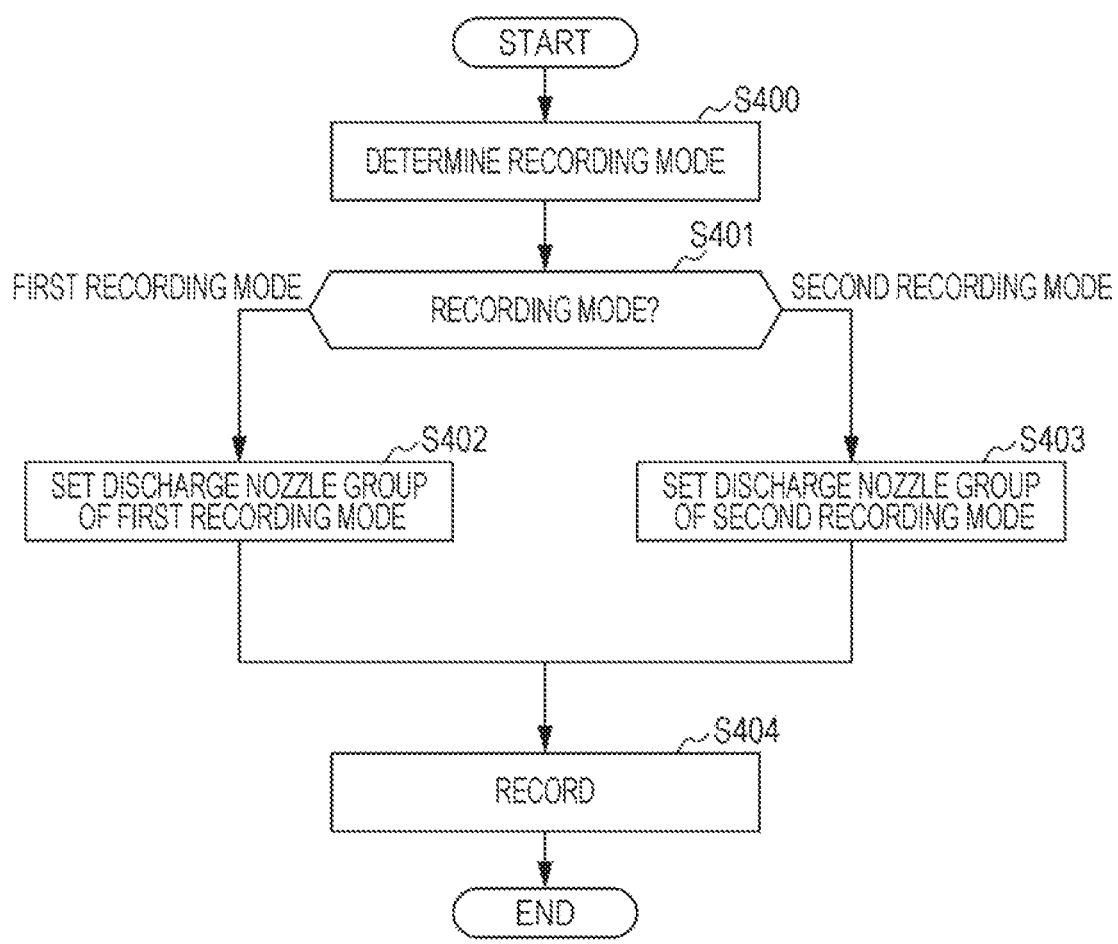
FIG. 6 is a flowchart illustrating an example of processing performed when recording is performed by an ink jet recording apparatus used in an ink jet recording method of an embodiment.

FIG. 6 is a flowchart illustrating an example of processing performed when recording is performed in an ink jet recording apparatus. When starting the recording, the controller of the ink jet recording apparatus determines a recording mode in Step 400. The recording mode is a recording type in which details of the recording such as an arrangement of discharge nozzle groups or non-discharge nozzle groups used for recording, a discharge amount, an overprinting mode, an operation of the recording head at the time of recording, an operation of the recording medium were determined. The details of the recording may also include an adhesion amount of the treatment liquid and the like.

The recording mode is determined according to an input signal input from an external device such as a computer to the ink jet recording apparatus, or is determined according to input information that a user inputs to a user input unit provided in the ink jet recording apparatus. Here, the input signal from the external device or the input information from the user may be information directly designating the recording mode, and may also be information on recording, such as type information of a recording medium to which recording is performed, a designation of recording speed, or designation of image quality. Also, the information on recording is not limited thereto. In the latter case, correspondence information in which the recording mode corresponding to the information on the recording was determined is recorded in advance in the ink jet recording apparatus, such as the controller, the ink jet recording apparatus determines the recording mode referring to the correspondence information. Alternatively, the recording mode may be determined using an artificial intelligence technology (AI technology).

In Step S401, the determined recording mode is discriminated. In Step S402 or S403, the discharge nozzle group associated with the recording mode is set according to the determined recording mode. In Step S404, recording is executed. FIG. 6 shows two types of the recording mode which are the first recording mode and the second recording mode, but the types of the recording mode may be three or more.

In this example, it is preferable in that the recording apparatus can have a different arrangement of the discharge nozzle groups according to the recording mode, and can perform various recording.

1.7. Adhesion Amount in Ink Jet Recording Method

The recording area of the recording medium is preferable to have an area in which an adhesion amount of each of the white ink and the non-white ink adhering to the recording medium is 5.0 mg/inch$^2$ or more. The adhesion amount of the area is more preferably 7.0 mg/inch$^2$ or more, and still more preferably 15.0 mg/inch$^2$ or more. In addition, the adhesion amount of the area is preferably 20.0 mg/inch$^2$ or less. When forming such the area, it is possible to further enhance quality of an image to be obtained. Preferably, it is more preferable that each adhesion amount of an area where the adhesion amount of the white ink is the largest and an area where the adhesion amount of the non-white ink is the largest is in the range.

Also, it is preferable that an area where the adhesion amount of the treatment liquid is preferably from 5.0% by mass to 50.0% by mass, relative to the total adhesion amount of the white ink and the non-white ink is formed in the recording medium. In the area, the adhesion amount of the treatment liquid is more preferably from 10.0% by mass to 40.0% by mass, still more preferably from 15.0% by mass to 35.0% by mass, and particularly preferably from 20.0% by mass to 30.0% by mass. When the treatment liquid adheres twice or more, the adhesion amount of the treatment liquid is total adhesion amount thereof. In this case, it is possible to more reliably obtain an effect of aggregation or thickening of the components of the white ink and the non-white ink. Accordingly, the color development of each ink can be further enhanced. In addition, more excellent crack resistance, image quality, scratch resistance, or discharge stability is obtained. It is more preferable that the relative adhesion amount between the treatment liquid and the ink is set to be in the range in an area where the adhesion amount of the ink is the largest, in the recording area to which the treatment liquid and the ink adhere. It is more preferable that the adhesion amount of the treatment liquid is in the range, in an area where the relative adhesion amount between the treatment liquid and the ink is the largest.

1.8. Procedure or the Like of Steps in Ink Jet Recording Method

A procedure of performing the white ink adhesion step and the non-white ink adhesion step is not particularly limited. However, it is more preferable that the white ink adhesion step is performed before the non-white ink adhesion step. In this manner, when the image is formed on the recording medium, a background image is formed by the white ink and a foreground image is formed by the non-white ink. Therefore, definition or the like of the image becomes better and the image quality is improved.

As shown in Arrangement Examples (1), (5), (2), (6), (10), and (13) in FIG. 5, when forming an overprinted image, it is more preferable that the treatment liquid adhesion step is performed in a mode of simultaneous ejection with the white ink adhesion step for a first layer or the non-white ink adhesion step for a first layer. That is, among the second discharge nozzle group and the third discharge nozzle group, one which is disposed upstream in the sub-scanning direction overlaps the first discharge nozzle group when projected in the main scanning direction. In this manner, it is easy to further prevent an image from cracking.

Here, since the treatment liquid adhering with simultaneous ejection with the ink adheres in an adhesion amount corresponding to an amount of one pass per pass, only the ink and the treatment liquid which adhered in one pass and can contact with each other react each time. On the other hand, when only the treatment liquid adheres first and then the ink adheres without the simultaneous ejection with the treatment liquid, although a final adhesion amount of the treatment liquid will be the same, the ink adheres in a state where all adhesion amount of the treatment liquid adhered to the recording medium. Therefore, the adhering ink reacts with the treatment liquid immediately and rapidly.

In this case, as shown in Arrangement Examples (1), (5), (10), and (13) in FIG. 5, the treatment liquid adhesion step may be performed not in the mode of simultaneous ejection with the white ink adhesion step for a first layer or the non-white ink adhesion step for a first layer. That is, among the second discharge nozzle group and the third discharge nozzle group, one which is disposed downstream in the sub-scanning direction does not overlap the first discharge nozzle group when projected in the main scanning direction. In this case, even when the treatment liquid adhesion step is performed not in the mode of simultaneous ejection with the white ink adhesion step for a second layer or the non-white ink adhesion step for a second layer, cracks are suppressed and excellent image quality tends to be obtained.

Alternatively, in this case, as shown in Arrangement Examples (2) and (6) in FIG. 5, the treatment liquid adhesion step may be performed not in a mode of simultaneous ejection with the white ink adhesion step for a first layer or the non-white ink adhesion step for a first layer. In this case, it is preferable in that the image quality is more excellent. That is, among the second discharge nozzle group and the third discharge nozzle group, one which is disposed downstream in the sub-scanning direction overlaps the first discharge nozzle group when projected in the main scanning direction.

Alternatively, as shown in Arrangement Examples (9) and (12) in FIG. 5, the treatment liquid adhesion step may be performed in a mode of simultaneous ejection with the white ink adhesion step not for a first layer or the non-white ink adhesion step not for a first layer. That is, among the second discharge nozzle group and the third discharge nozzle group, one which is disposed downstream in the sub-scanning direction overlaps the first discharge nozzle group when projected in the main scanning direction. Also in this case, it is preferable in that the crack resistance is excellent and the image quality is excellent. In this case, the white ink adhesion step for a first layer or the non-white ink adhesion step for a first layer may be performed not in a mode of simultaneous ejection with the treatment liquid. That is, among the second discharge nozzle group and the third discharge nozzle group, one which is disposed upstream in the sub-scanning direction may not overlap the first discharge nozzle group when projected in the main scanning direction.

Also, the treatment liquid adhesion step may also be performed prior to the white ink adhesion step and the non-white ink adhesion step. In this manner, the aggregating agent contained in the treatment liquid adheres to the recording medium sufficiently in advance. Accordingly, the treatment liquid can sufficiently act on an ink adhering first among the white ink and the non-white ink. In this case, it is preferable in that the image quality is more excellent.

Performing the treatment liquid adhesion step prior to the white ink adhesion step and the non-white ink adhesion step means that at least a start of the treatment liquid adhesion step is performed prior to a start of an ink adhesion step. For example, in Arrangement Examples (1), (5), (9), and (12) in FIG. 5, the first discharge nozzle group has a portion disposed upstream of the second discharge nozzle group and the third discharge nozzle group in the sub-scanning direction, when projected in the main scanning direction. The portion performs the treatment liquid adhesion step of causing the treatment liquid to adhere to a recording area to which the white ink or the non-white ink will adhere by the second discharge nozzle group or the third discharge nozzle group by the main scanning, in main scanning prior to the main scanning.

On the other hand, the treatment liquid adhesion step may also be performed not prior to the white ink adhesion step and the non-white ink adhesion step. In this case, it is preferable in that there is no need to have a location, in which the first discharge nozzle group is disposed, at the most upstream in the sub-scanning direction, and it is possible to make the recording apparatus smaller in the sub-scanning direction. In addition, it is preferable in that the location in which the second discharge nozzle group or the third discharge nozzle group is disposed is expanded in the sub-scanning direction, a length of the second discharge nozzle group or the third discharge nozzle group can be extended in the sub-scanning direction, and recording speed can be increased.

It is preferable that the treatment liquid adhesion step is not performed after a step which is performed first among the white ink adhesion step and the non-white ink adhesion step, and before a step which is performed later among the white ink adhesion step and the non-white ink adhesion step. For example, it is preferable that there is no portion of the first discharge nozzle group between the second discharge nozzle group and the third discharge nozzle group, when projected in the main scanning direction. In this manner, it is preferable in that the aggregating agent contained in the treatment liquid can be prevented from acting too much on an ink adhering later among inks of the second discharge nozzle group and the third discharge nozzle group and the crack resistance is more excellent.

Also, the second discharge nozzle group and the third discharge nozzle group do not have portions which do not overlap each other, when projected in the main scanning direction. That is, it is preferable to not perform simultaneous ejection of the second discharge nozzle group and the third discharge nozzle group, in that mixing of colors between the white ink and the non-white ink is hard to occur.

1.8. Operational Effect

The ink jet recording method of the present embodiment is performed using the ink jet recording apparatus, that includes the first discharge nozzle group discharging the treatment liquid, the second discharge nozzle group discharging the white ink, and the third discharge nozzle group discharging the non-white ink, and is controlled such that the second discharge nozzle group and the third discharge nozzle group have portions that do not overlap each other when projected in the main scanning direction and one or both of the second discharge nozzle group and the third discharge nozzle group have a portion overlapping the first discharge nozzle group when projected in the main scanning direction. Therefore, it is possible to easily record an overprinted image, in which cracks are suppressed, with good image quality with little bleeding and the like.

When it is attempted to fix the ink early with the treatment liquid in order to suppress the bleeding, cracks may occur in a laminated image of the white ink and the non-white ink. However, in the ink jet recording method of the present embodiment, it is possible to suppress the bleeding and also possible to suppress the cracks, by ejecting at least one of the white ink and the non-white ink simultaneously with the treatment liquid.

Here, the inventors first noticed, as a cause of the cracks, that in a case of using the white ink and the non-white ink, when the ink is reacted with the aggregating agent by using the treatment liquid, the cracks occurred remarkably in the recording area of the recorded matter. When the ink reacts with the treatment liquid, the components contained in the ink aggregate, and the aggregated components are heated and dried to form a coating film of a solid content of the ink. In this case, relatively large particles in which the pigment, the resin fine particles, and the like are aggregated are gathered to form the coating film. It is presumed that the white ink and the non-white ink contain different components due to different functions thereof, and when these aggregate due to the treatment liquid, differences in sizes of the particles forming the coating film, how to be gathered, hardness, and the like occur. It is presumed that when the coating films having these differences are laminated, cracking is likely to occur in a process of drying of the coating film by the post-heating step.

Next, it is presumed that the ink (ink of second layer) adhering later among the white ink and the non-white ink reacts rapidly with the treatment liquid to cause the cracking. As a consideration leading to these presumptions, the followings are considered. First, even when the treatment liquid adheres to the recording medium prior to an ink adhering first (ink of first layer) among the white ink and the non-white ink, and the ink adhering first aggregates and is thickened rapidly, the cracking does not occur with this alone. From this fact, it is considered that the ink adhering first may be sufficiently reacted with the treatment liquid and good image quality is obtained.

On the other hand, as demonstrated by examples to be described later, in a case of the ink adhering later, when the ink rapidly aggregates and is thickened, the cracking is likely to occur. That is, it is considered that when the later ink is rapidly solidified in a state where the reaction of the ink adhering first is sufficiently completed, the cracking is likely to occur. Accordingly, regarding the later ink, it is considered that it is more preferable that the reaction is performed under mild conditions in order to obtain the good image quality and the reaction is performed to the necessary minimum.

From these facts, it is considered that it is preferable not to cause the treatment liquid alone to adhere between the ink adhering first and the ink adhering later. Then, it is considered that an image with good image quality (bleeding suppressed) and few cracks can be obtained by causing the treatment liquid to adhere so as to obtain sufficient image quality of the ink adhering later.

According to the ink jet recording method of the present embodiment, the treatment liquid and the ink in the amount adhering in one main scanning can be reacted with each other by ejecting the treatment liquid simultaneously with at least one ink of the inks for the first layer and the second layer. Therefore, it is considered that the reaction can be mild and the image with good image quality (bleeding suppressed) and few cracks can be obtained. When ejecting the ink for the second layer simultaneously with the treatment liquid, the ink for the second layer can be reacted little by little. When ejecting the ink for the first layer simultaneously with the treatment liquid, some of the treatment liquid exudes to the top of a layer of the ink for the first layer, the ink for the second layer can also be reacted, and the reaction is easily controlled in an aspect that the reaction at the second layer does not occur rapidly. In any case, the crack resistance can be improved.

In addition, in the ink jet recording method of the present embodiment, when recording is performed by main scanning a specific recording area in plural times, the adhesion amount of the treatment liquid or the ink per pass decreases, and the reaction can be further mild. The number of passes is preferably 2 or more, but is not limited thereto. However, the number of passes is preferably 15 or less, more preferably from 4 to 10, and still more preferably from 5 to 8.

2. Examples and Comparative Examples

Hereinafter, an embodiment of the present disclosure will be described more specifically using Examples, but the present disclosure is not limited to these Examples. Hereinafter, "part(s)" and "%" are based on mass unless otherwise specified.

2.1. Preparation of Treatment Liquid, White Ink, and Non-White Ink

With material compositions shown in Table 1, treatment liquids R1 to R3, white inks W1 to W4, and non-white inks C1 to C4 all having different material compositions were obtained. Each composition was prepared in a manner that materials shown in Table 1 were placed in a container, stirred and mixed for 2 hours with a magnetic stirrer, and then filtered with a membrane filter with a pore size of 5 μm to remove impurities such as dust or coarse particles. All numerical values in Table 1 represent % by mass, and pure water was added such that the total mass of the composition became 100% by mass. A white pigment dispersion and a non-white coloring material dispersion were prepared as follows in advance. Also, the numbers in the Table 1 represent % by mass of a solid content in an ink to be supplied by the dispersion, % by mass of a solid content in an ink to be supplied by a resin particle emulsion, and % by mass of a solid content in an ink to be supplied by a wax emulsion, respectively.

Preparation of White Pigment Dispersion

First, 4 parts by mass of an acrylic acid-acrylic acid ester copolymer (weight average molecular weight: 25,000, acid value: 18) as a resin dispersant were added to and dissolved in 155 parts by mass of ion-exchanged water in which 0.1 parts by mass of 30% aqueous ammonia solution (neutralizing agent) was dissolved. 40 Parts by mass of titanium dioxide (C.I. pigment white 6) as a white pigment was added thereto, and dispersion treatment was performed for 10 hours in a ball mill using zirconia beads. Thereafter, centrifugal filtration using a centrifuge was performed to remove impurities such as coarse particles or dust. A concentration of the white pigment was adjusted to 20% by mass and to obtain the white pigment dispersion. A particle diameter of the white pigment was 350 nm in average particle diameter.

Preparation of Non-White Coloring Material Dispersion

First, 7.5 parts by mass of an acrylic acid-acrylic acid ester copolymer (weight average molecular weight: 25,000, acid value: 180) as a resin dispersant were added to and dissolved in 160.5 parts by mass of ion-exchanged water in which 2 parts by mass of 30% aqueous ammonia solution (neutralizing agent) was dissolved. 30 Parts by mass of C.I. pigment blue 15:3 as a cyan pigment was added thereto, and dispersion treatment was performed for 10 hours in a ball mill using zirconia beads. Thereafter, centrifugal filtration using a centrifuge was performed to remove impurities such as coarse particles or dust. A concentration of the cyan pigment was adjusted to 15% by mass and to obtain the non-white coloring material (cyan pigment) dispersion. In this case, a particle diameter of the cyan pigment was 100 nm in average particle diameter.

Preparation of Resin Particle Emulsion

Two kinds of resin particle emulsions (styrene acrylic resin emulsion A and styrene acrylic resin emulsion B) were prepared. Each resin particle emulsion was an emulsion having a solid content of 40% by mass. In the resin particles, a kind and a composition ratio of an acrylic monomer at the time of resin polymerization were adjusted. Thus, resin A having high reactivity was obtained mainly by making an acid value of whole resin relatively high. In addition, resin B having low reactivity was obtained by making the acid value relatively low. In this manner, the ink using the styrene acrylic resin emulsion A was prepared to have a higher thickening ratio than a thickening ratio of the ink using the styrene acrylic resin emulsion B. The ink was adjusted using such a resin.

TABLE 1

| | | Treatment liquid | | | White ink | | | |
|---|---|---|---|---|---|---|---|---|
| | | R1 | R2 | R3 | W1 | W2 | W3 | W4 |
| Aggregating agent | Magnesium sulfate heptahydrate | 7.0 | — | — | — | — | — | — |
| | Cationic polymer | — | 4.0 | — | — | — | — | — |
| | Malonic acid | — | — | 7.0 | — | — | — | — |
| Pigment | Titanium dioxide | — | — | — | 10.0 | 10.0 | 10.0 | 10.0 |
| | Carbon black | — | — | — | — | — | — | — |
| Resin particles | Styrene acrylic A | — | — | — | 5.0 | 10.0 | — | 5.0 |
| | Styrene acrylic B | — | — | — | — | — | 5.0 | — |
| Wax | Polyethylene based | — | — | — | 1.0 | 1.0 | 1.0 | 1.0 |
| Surfactant | Silicone based | 1.0 | 1.0 | 1.0 | 1.0 | 1.0 | 1.0 | 1.0 |
| Organic solvent | 2-Pyrollidone | 30.0 | 30.0 | 30.0 | 20.0 | 20.0 | 20.0 | 20.0 |
| | 2-methyl-1,3-propanediol | 2.0 | 2.0 | 2.0 | 2.0 | 2.0 | 2.0 | — |
| | Glycerin | — | — | — | — | — | — | 2.0 |
| Water | Pure water | Remainder | Remainder | Remainder | Remainder | Remainder | Remainder | Remainder |
| | Total | 100 | 100 | 100 | 100 | 100 | 100 | 100 |

TABLE 1-continued

|  |  | Non-white ink | | | |
|---|---|---|---|---|---|
|  |  | C1 | C2 | C3 | C4 |
| Aggregating agent | Magnesium sulfate heptahydrate | — | — | — | — |
|  | Cationic polymer | — | — | — | — |
|  | Malonic acid | — | — | — | — |
| Pigment | Titanium dioxide | — | — | — | — |
|  | Carbon black | 2.0 | 4.0 | 0.5 | 2.0 |
| Resin particles | Styrene acrylic A | 5.0 | 10.0 | — | 5.0 |
|  | Styrene acrylic B | — | — | 1.0 | — |
| Wax | Polyethylene based | 1.0 | 1.0 | 1.0 | 1.0 |
| Surfactant | Silicone based | 1.0 | 1.0 | 1.0 | 1.0 |
| Organic solvent | 2-Pyrollidone | 25.0 | 25.0 | 25.0 | 25.0 |
|  | 2-methyl-1,3-propanediol | 2.0 | 2.0 | 2.0 | — |
|  | Glycerin | — | — | — | 2.0 |
| Water | Pure water | Remainder | Remainder | Remainder | Remainder |
|  | Total | 100 | 100 | 100 | 100 |

The materials in Table 1 are as follows.
Aggregating agent: Cationic polymer "Catiomaster PD-7, polyamine resin (epichlorohydrin-amine derivative resin)" manufactured by Yokkaichi Chemical Co., Ltd.
Resin particles: Styrene acrylic resin A: High in aggregation property (Preparation)
Resin particles: Styrene acrylic resin B: Low in aggregation property (Preparation)
Wax: Polyethylene-based "AQUACER 539" manufactured by BYK
Surfactant: Silicone-based "BYK 348" manufactured by BYK Commercially available titanium dioxide was used as the white pigment, and commercially available carbon black was used as the non-white coloring material.

2.2. Evaluation Method 2.2.1. Recording Test

An ink jet printer "SC-S40650" (manufactured by SEIKO EPSON CORPORATION) was modified and a drying mechanism was provided thereto. As the drying step in the adhesion step, heating was performed by the platen. The heating was performed to reach a recording medium temperature at the time of adhesion in Tables 2 to 5. A surface temperature of the recording medium is the highest temperature in the step. Also, in each example, as a heater used for post-heating (secondary heating), an infrared radiation mechanism was provided downstream of the recording medium in the transport direction and used. A post-heating temperature (recording medium surface temperature) and time were 85.0° C. and 30.0 seconds.

The arrangement of the discharge nozzle groups used in a recording test of a recording head was the same as shown in FIG. 5. In FIG. 5, numbers shown in parentheses are numbers of arrangement examples of the discharge nozzle groups, and are also the numbers of methods (recording method). In FIG. 5, an area enclosed by a broken line is the discharge nozzle group of each nozzle array. Also, R, W, and C correspond to nozzle arrays filled with respectively the treatment liquid, the white ink, and the non-white ink. Also, "SS" indicates the sub-scanning direction, and indicates that the recording medium M is transported along an arrow direction. A horizontal direction of FIG. 5 is the main scanning direction.

In FIG. 5, a nozzle array corresponding to each liquid is treated as that although there are two rows, nozzles of one row and nozzles of another row are arranged in a form in which the nozzles of the other row are alternately positioned between the nozzles of the one row when projected in the main scanning direction, and thus the one row and the other row each have a nozzle density of 360 dpi, but both together form one nozzle array having a nozzle density of 720 dpi. Among the C nozzle groups, only one nozzle array at a left end of four nozzle arrays in FIG. 5 was used for the recording test. A length of the one nozzle array in the sub-scanning direction was 1 inch.

In Methods (1), (2), (5), (6), (9), (10), (12), and (13) shown on the upper side of FIG. 5, R discharge nozzle group and one or both of W discharge nozzle group and C discharge nozzle group have a portion overlapping each other when projected in the main scanning direction.

In Methods (3), (4), (7), (8), (11), and (14) shown on the lower side of FIG. 5, the R discharge charge group and both the W discharge charge group and the C discharge charge group have no overlapping portion when projected in the main scanning direction.

In methods shown on the right and left sides of FIG. 5, locations of the W discharge nozzle group and the C discharge nozzle group were interchanged respectively.

Figure 7:
FIG. 7 is a schematic diagram showing procedures of each liquid stacked by several recording methods.

FIG. 7 is a schematic diagram showing procedures of each liquid stacked by recording methods of Examples, Comparative Example, and Reference Examples. The numbers in parentheses in FIG. 7 correspond to the methods of FIG. 5, respectively. The treatment liquid, the white ink, and the non-white ink adhered in order according to the recording method shown in FIG. 7. In addition, in each recording method, the discharge nozzle group was set as shown in FIG. 5, and used for recording. Each layer was formed in eight passes (by performing main scanning eight times).

The adhesion amounts of the treatment liquid, the white ink, and the non-white ink in each example were described in Tables 2 to 5. In Tables 2 to 5, "Treatment liquid 1" and "Treatment liquid 2" correspond to R1 and R2 in FIG. 7, respectively. Also, the total adhesion amount of the treatment liquid relative to the total adhesion amount of the white ink and the non-white ink in each example was described in Tables 2 to 5.

The numbers shown in parentheses in FIG. 7 indicate the recording method. In addition, the recording medium was indicated by a sign M, the treatment liquid was indicated by a sign R, the white ink was indicated by a sign W, and the non-white ink was indicated by a sign C. Also, "+" in the signs indicated that two liquids were simultaneously ejected. Furthermore, the treatment liquid R includes "R1" and "R2", which represent first adhesion and second adhesion, respectively. Thus, each liquid adhered from the side close to the recording medium M side.

For example, in a case of Method (1), the first layer was obtained by causing the treatment liquid to adhere by the R discharge nozzle group located at the uppermost stream in the sub-scanning direction in 8 passes, the second layer was obtained by causing the treatment liquid and the white ink to adhere using a portion of the R discharge nozzle group overlapping the W discharge nozzle group when projected in the main scanning direction and the W discharge nozzle group in 8 passes, and the third layer was obtained by causing the non-white ink to adhere using the C discharge nozzle group in 8 passes.

In addition, in Reference Example 2, although Method (1) was described, nozzle arrays of the treatment liquid "R" were set as a non-discharge nozzle group and treatment liquids "R1" and "R2" did not adhere, and a layer of "W" and a layer of "C" were stacked on the recording medium M.

In addition, in Reference Example 3, although Method (3) was described, in Method (3), all nozzle arrays of the non-white ink "C" were set as the non-discharge nozzle group, and instead of this, the discharge nozzle group was provided most downstream of the nozzle array of the white ink "W" (see W nozzle array of Method (7)), accordingly, the white ink "W" adhered instead of the non-white ink "C".

That is, the treatment liquid, the white ink, the treatment liquid, and white ink adhered in this order.

Furthermore, in Reference Example 4, although Method (3) was described, in Method (3), the nozzle array of the white ink "W" was set as the non-discharge nozzle group, and instead of this, the discharge nozzle group was provided at a location between the two discharge nozzle groups of the treatment liquid R (see C nozzle array of Method (7)), accordingly, the non-white ink "C" adhered instead of the white ink "W". That is, the treatment liquid, the non-white ink, the treatment liquid, and the non-white ink adhered in this order.

Also, the thickening ratio of each ink in each Example was described in Tables 2 to 5. The ink and the treatment liquid used in the ink jet recording method in each Example were mixed and stirred in a mass ratio of Ink:Treatment liquid=10:1 to determine a ratio of viscosity of a mixed liquid after mixing to viscosity of the ink before mixing, and this ratio was used as the thickening ratio. The viscosity was measured at 20° C.

In each of Examples, as the recording medium, a clear PET medium E1000ZC (manufactured by Lintec Corporation) was used. The recording head was filled with the treatment liquid, the white ink, and the non-white ink. Each of the treatment liquid and the ink was superimposed in a test pattern and recorded on the recording medium in the order shown in the recording method. A dot density was adjusted such that the coating amount (adhesion amount) in Tables 2 to 5 was obtained as a basic resolution of 1440× 1400 dpi for each treatment liquid and ink.

TABLE 2

|  |  | Example 1 | Example 2 | Example 3 | Example 4 | Example 5 |
|---|---|---|---|---|---|---|
| Inks | Treatment liquid | R1 | R1 | R1 | R1 | R1 |
|  | White ink | W1 | W1 | W4 | W1 | W1 |
|  | Non-white ink | C1 | C1 | C4 | C1 | C1 |
| Adhesion amount (mg/inch$^2$) | Treatment liquid 1 | 1.5 | 1.5 | 1.5 | 1.5 | 3.0 |
|  | White ink | 15.0 | 15.0 | 15.0 | 15.0 | 150 |
|  | Treatment liquid 2 | 1.5 | 1.5 | 1.5 | 1.5 | — |
|  | Non-white ink | 15.0 | 15.0 | 15.0 | 15.0 | 15.0 |
|  | Recording method | Method 1 | Method 1 | Method 1 | Method 1 | Method 10 |
| Treatment liquid adhesion amount (% by mass relative to ink) |  | 10.0 | 10.0 | 10.0 | 10.0 | 10.0 |
| Recording medium temperature at the time of adhesion (° C.) |  | 30.0 | 40.0 | 40.0 | 45.0 | 30.0 |
| Thickening ratio by mixing treatment liquid | White ink | 1.2 | 1.2 | 1.2 | 1.2 | 1.2 |
|  | Non-white ink | 3.0 | 3.0 | 3.0 | 3.0 | 3.0 |
| Image quality (Second layer side) | Cracking | A | B | A | C | C |
|  | Bleeding | A | A | B | A | A |
|  | OD | A | A | B | A | B |
| Image quality (First layer side) | Aggregation and clogging | A | A | B | A | B |
|  | Scratch resistance | A | A | B | A | B |
|  | Discharge stability | A | B | A | C | A |

|  |  | Example 6 | Example 7 | Example 8 | Example 9 |
|---|---|---|---|---|---|
| Inks | Treatment liquid | R1 | R1 | R1 | R1 |
|  | White ink | W1 | W1 | W1 | W1 |
|  | Non-white ink | C1 | C1 | C1 | C1 |
| Adhesion amount (mg/inch$^2$) | Treatment liquid 1 | 1.5 | 1.5 | 3.0 | 4.5 |
|  | White ink | 15.0 | 15.0 | 15.0 | 15.0 |
|  | Treatment liquid 2 | 1.5 | 1.0 | 3.0 | 4.5 |
|  | Non-white ink | 15.0 | 10.0 | 15.0 | 15.0 |
|  | Recording method | Method 2 | Method 2 | Method 2 | Method 2 |
| Treatment liquid adhesion amount (% by mass relative to ink) |  | 10.0 | 10.0 | 20.0 | 30.0 |
| Recording medium temperature at the time of adhesion (° C.) |  | 30.0 | 30.0 | 30.0 | 30.0 |

TABLE 2-continued

|  |  |  |  |  |  |  |
|---|---|---|---|---|---|---|
| Thickening ratio by mixing treatment liquid | White ink | 1.2 | 1.2 | 1.2 | 1.2 |
|  | Non-white ink | 3.0 | 3.0 | 3.0 | 3.0 |
| Image quality (Second layer side) | Cracking | B | A | B | C |
|  | Bleeding | B | A | A | A |
|  | OD | B | C | B | A |
| Image quality (First layer side) | Aggregation and clogging | B | B | A | A |
|  | Scratch resistance | B | B | B | B |
|  | Discharge stability | A | A | A | B |

TABLE 3

|  |  | Example 10 | Example 11 | Example 12 | Example 13 |
|---|---|---|---|---|---|
| Inks | Treatment liquid | R1 | R1 | R2 | R3 |
|  | White ink | W2 | W1 | W1 | W1 |
|  | Non-white ink | C1 | C2 | C1 | C1 |
| Adhesion amount (mg/inch$^2$) | Treatment liquid 1 | 1.5 | 1.5 | 1.5 | 1.5 |
|  | White ink | 15.0 | 15.0 | 15.0 | 15.0 |
|  | Treatment liquid 2 | 1.5 | 1.5 | 1.5 | 1.5 |
|  | Non-white ink | 15.0 | 15.0 | 15.0 | 15.0 |
|  | Recording method | Method 2 | Method 2 | Method 2 | Method 2 |
| Treatment liquid adhesion amount (% by mass relative to ink) |  | 10.0 | 10.0 | 10.0 | 10.0 |
| Recording medium temperature at the time of adhesion (° C.) |  | 30.0 | 30.0 | 30.0 | 30.0 |
| Thickening ratio by mixing treatment liquid | White ink | 1.5 | 1.2 | 1.2 | 1.2 |
|  | Non-white ink | 3.0 | 5.0 | 3.0 | 3.0 |
| Image quality (Second layer side) | Cracking | A | C | A | B |
|  | Bleeding | B | A | A | B |
|  | OD | B | A | B | B |
| Image quality (First layer side) | Aggregation and clogging | A | B | B | B |
|  | Scratch resistance | B | B | B | A |
|  | Discharge stability | A | B | B | A |

|  |  | Example 14 | Example 15 | Example 16 | Example 17 |
|---|---|---|---|---|---|
| Inks | Treatment liquid | R1 | R1 | R1 | R1 |
|  | White ink | W1 | W1 | W1 | W1 |
|  | Non-white ink | C1 | C1 | C1 | C1 |
| Adhesion amount (mg/inch$^2$) | Treatment liquid 1 | 3.0 | 1.5 | 1.5 | 1.5 |
|  | White ink | 15.0 | 15.0 | 15.0 | 15.0 |
|  | Treatment liquid 2 | 3.0 | 1.5 | 1.5 | 1.5 |
|  | Non-white ink | 15.0 | 15.0 | 15.0 | 15.0 |
|  | Recording method | Method 1 | Method 9 | Method 9 | Method 9 |
| Treatment liquid adhesion amount (% by mass relative to ink) |  | 20.0 | 10.0 | 10.0 | 10.0 |
| Recording medium temperature at the time of adhesion (° C.) |  | 30.0 | 30.0 | 35.0 | 40.0 |
| Thickening ratio by mixing treatment liquid | White ink | 1.2 | 1.2 | 1.2 | 1.2 |
|  | Non-white ink | 3.0 | 3.0 | 3.0 | 3.0 |
| Image quality (Second layer side) | Cracking | B | A | A | B |
|  | Bleeding | A | B | A | A |
|  | OD | A | B | B | A |
| Image quality (First layer side) | Aggregation and clogging | A | A | A | A |
|  | Scratch resistance | B | B | B | B |
|  | Discharge stability | A | A | A | B |

TABLE 4

|  |  | Comparative Example 1 | Comparative Example 2 | Comparative Example 3 | Comparative Example 4 |
|---|---|---|---|---|---|
| Inks | Treatment liquid | R1 | R1 | R1 | R1 |
|  | White ink | W1 | W1 | W1 | W1 |
|  | Non-white ink | C1 | C1 | C1 | C1 |

TABLE 4-continued

|  |  |  |  |  |  |
|---|---|---|---|---|---|
| Adhesion amount (mg/inch²) | Treatment liquid 1 | 3.0 | 9.0 | 1.5 | 3.0 |
|  | White ink | 15.0 | 15.0 | 15.0 | 15.0 |
|  | Treatment liquid 2 | — | — | 1.5 | — |
|  | Non-white ink | 15.0 | 15.0 | 15.0 | 15.0 |
|  | Recording method | Method 4 | Method 4 | Method 3 | Method 11 |
| Treatment liquid adhesion amount (% by mass relative to ink) |  | 10.0 | 30.0 | 10.0 | 10.0 |
| Recording medium temperature at the time of adhesion (° C.) |  | 30.0 | 30.0 | 30.0 | 30.0 |
| Thickening ratio by mixing treatment liquid | White ink | 1.2 | 1.2 | 1.2 | 1.2 |
|  | Non-white ink | 3.0 | 3.0 | 3.0 | 3.0 |
|  | Cracking | A | D | D | D |
| Image quality (Second layer side) | Bleeding | C | B | B | A |
|  | OD | C | A | A | B |
| Image quality (First layer side) | Aggregation and clogging | A | A | B | C |
|  | Scratch resistance | A | C | B | B |
|  | Discharge stability | A | A | A | A |

|  |  | Reference Example 1 | Reference Example 2 | Reference Example 3 | Reference Example 4 |
|---|---|---|---|---|---|
| Inks | Treatment liquid | R1 | — | R1 | R1 |
|  | White ink | W3 | W1 | W1 | — |
|  | Non-white ink | C3 | C1 | — | C1 |
| Adhesion amount (mg/inch²) | Treatment liquid 1 | 1.5 | — | 3.0 | — |
|  | White ink | 15.0 | 15.0 | 30.0 | — |
|  | Treatment liquid 2 | 1.5 | — | — | 3.0 |
|  | Non-white ink | 15.0 | 15.0 | — | 30.0 |
|  | Recording method | Method 1 | Method 1 | Method 3 | Method 3 |
| Treatment liquid adhesion amount (% by mass relative to ink) |  | 10.0 | 0.0 | 10.0 | 10.0 |
| Recording medium temperature at the time of adhesion (° C.) |  | 30.0 | 30.0 | 30.0 | 30.0 |
| Thickening ratio by mixing treatment liquid | White ink | 1.0 | 1.2 | 1.2 | 1.2 |
|  | Non-white ink | 1.1 | 3.0 | 3.0 | 3.0 |
|  | Cracking | A | A | A | A |
| Image quality (Second layer side) | Bleeding | C | C | — | A |
|  | OD | B | C | — | A |
| Image quality (First layer side) | Aggregation and clogging | C | C | A | — |
|  | Scratch resistance | A | A | A | A |
|  | Discharge stability | A | A | A | A |

TABLE 5

|  |  | Example 18 | Example 19 | Example 20 | Example 21 |
|---|---|---|---|---|---|
| Inks | Treatment liquid | R1 | R1 | R1 | R1 |
|  | White ink | W1 | W1 | W1 | W1 |
|  | Non-white ink | C1 | C1 | C1 | C1 |
| Adhesion amount (mg/inch²) | Treatment liquid 1 | 1.5 | 1.5 | 1.5 | 3.0 |
|  | White ink | 15.0 | 15.0 | 15.0 | 15.0 |
|  | Treatment liquid 2 | 1.5 | 1.5 | 1.5 | — |
|  | Non-white ink | 15.0 | 15.0 | 15.0 | 15.0 |
|  | Recording method | Method 5 | Method 6 | Method 12 | Method 13 |
| Treatment liquid adhesion amount (% by mass relative to ink) |  | 10.0 | 10.0 | 10.0 | 10.0 |
| Recording medium temperature at the time of adhesion (° C.) |  | 30.0 | 30.0 | 30.0 | 30.0 |
| Thickening ratio by mixing treatment liquid | White ink | 1.2 | 1.2 | 1.2 | 1.2 |
|  | Non-white ink | 3.0 | 3.0 | 3.0 | 3.0 |
|  | Cracking | A | A | A | B |
| Image quality (Second layer side) | Bleeding | A | B | B | A |
| Image quality (First layer side) | OD | A | B | A | B |
|  | Aggregation and clogging | A | B | A | B |
|  | Scratch resistance | A | A | B | B |
|  | Discharge stability | A | A | A | A |

TABLE 5-continued

| | | Comparative Example 5 | Comparative Example 6 | Comparative Example 7 |
|---|---|---|---|---|
| Inks | Treatment liquid | R1 | R1 | R1 |
| | White ink | W1 | W1 | W1 |
| | Non-white ink | C1 | C1 | C1 |
| Adhesion amount (mg/inch$^2$) | Treatment liquid 1 | 1.5 | 3.0 | 3.0 |
| | White ink | 15.0 | 15.0 | 15.0 |
| | Treatment liquid 2 | 1.5 | — | — |
| | Non-white ink | 15.0 | 15.0 | 15.0 |
| Recording method | | Method 7 | Method 8 | Method 14 |
| Treatment liquid adhesion amount (% by mass relative to ink) | | 10.0 | 10.0 | 10.0 |
| Recording medium temperature at the time of adhesion (° C.) | | 30.0 | 30.0 | 30.0 |
| Thickening ratio by mixing treatment liquid | White ink | 1.2 | 1.2 | 1.2 |
| | Non-white ink | 1.2 | 1.2 | 3.0 |
| Image quality (Second layer side) | Cracking | D | A | D |
| | Bleeding | B | C | A |
| Image quality (First layer side) | OD | A | C | B |
| | Aggregation and clogging | B | A | C |
| | Scratch resistance | B | A | B |
| | Discharge stability | A | A | A |

2.2.2. Evaluation Method 2.2.2.1. Evaluation of Cracking

An evaluation was performed by observing with visual observation and a loupe from the side recorded in the second layer of the recorded matter obtained in each example. That is, the evaluation was performed by an observation from a recording surface side of the recording medium according to the following criteria, and evaluation results were described in Tables 2 to 5. Cracking did not occur before the post-heating step, but occurred by the post-heating step.

A: There is no crack in an image.
B: Cracks in the image are not visible visually but are visible with a loupe.
C: Cracks in the image are slightly visible visually.
D: Cracks in the image are remarkably visible on an entire surface visually.

2.2.2.2. Aggregation•Fill Evaluation

A solid image area of the recorded matter of each example was observed through fluorescent light visually from the side on which the white ink image was formed, with transmitted light. An evaluation was performed according to the following criteria, and evaluation results were described in Tables 2 to 5.

A: There is no aggregation (uneven in density) or pinhole.
B: Aggregation (unevenness in density) or pinholes are slightly visible.
C: Aggregation (unevenness in density) or pinholes are remarkably visible.

2.2.2.3. Evaluation of Bleeding

An evaluation was performed by observing with visual observation and a loupe from a side, in which the non-white ink image was formed, to the recorded matter obtained in each example. The evaluation was performed according to the following evaluation criteria, and results thereof were described in Tables 2 to 5.

A: There is no bleeding in an image. Bleeding is not visible visually and by using the loupe.
B: Bleeding is not visible visually but visible using a loupe.
C: Bleeding can be seen visually.

2.2.2.4. Evaluation of OD (Color Development)

A measurement was performed to the recorded matter obtained in each example by a Spectrolino (trade name, manufactured by GretagMacbeth), on a side in which the non-white ink image was formed. The evaluation was performed according to the following evaluation criteria, based on a black OD value, and results thereof were described in Tables 2 to 5.

A: Black OD value is 2.0 or more
B: Black OD value is 1.8 or more and less than 2.0
C: Black OD value is less than 1.8

2.2.2.5. Evaluation of Scratch Resistance

The scratch resistance of the recorded matter obtained in each example was evaluated using a Color Fastness Rubbing Tester AB-301 (trade name, manufactured by Tester Sangyo Co., Ltd.). Specifically, the surface of the recording medium on which the image was recorded was rubbed back and forth 10 times under a load of 500 g with a friction element attached with a white cotton cloth (in accordance with JIS L 0803). Thus, a peeling state of the image (coating film) on the surface of the recording medium was visually observed, the evaluation was performed according to the following criteria, and results were described in Tables 2 to 5.

A: There is no peeling of the coating film.
B: Although the peeling of a coating film occurs, peeling occurred in an area within 10% with respect to the evaluation area.
C: The peeling of the coating film occurred in an area exceeding 10% of an evaluation area.

2.2.2.6. Evaluation of Discharge Stability

The image recording was continuously performed for hour under the condition of image formation using the whole nozzle arrays, and the nozzles of the discharge ink groups of the white ink and non-white ink after recording were inspected. The total non-discharge nozzle number of each of the white ink and the non-white ink was divided by the total number of nozzles, an evaluation was performed according to the following criteria, and the results were described in Tables 2 to 5.

A: Non-discharge nozzles are 1.0% or less.
B: Non-discharge nozzles are more than 1.0% and 2.0% or less.
C: Non-discharge nozzles are more than 2.0% and 5.0% or less.
D: Non-discharge nozzles are more than 5.0%.

2.3. Evaluation Results

From Example, Comparative Examples, and Reference Examples, the following was found.

In each example in which the treatment liquid adhesion step, the white ink adhesion step, and the non-white ink adhesion step are provided, and the used head includes the first discharge nozzle group discharging the treatment liquid, the second discharge nozzle group discharging the white ink, and the third discharge nozzle group discharging the non-white ink, and the second discharge nozzle group and the third discharge nozzle group have portions that do not overlap each other when projected in the main scanning direction, and one or both of the second discharge nozzle group and the third discharge nozzle group have a portion overlapping the first discharge nozzle group when projected in the main scanning direction, evaluations of both the image quality and cracking were good. That is, in Examples 1 to 21 in which the recording methods (1), (2), (9), (10), (5), (6), (12), and (13) were used, it is considered that at least one of the ink or non-white ink was ejected simultaneously with the treatment liquid, and therefore, good results were obtained. Also, from these results, it was found that even when any of the white ink and the non-white ink was in the first layer, the results were also good.

On the other hand, in each Comparative Example, it was not possible to obtain an evaluation result in which both the cracking and the image quality were good. The details will be described below.

From the comparison of Examples 1 and 15 with Examples 5 and 6, when the treatment liquid adhered prior to the adhesion of the white ink and the non-white ink, the image quality of the first layer and the crack resistance were more excellent.

On the other hand, in Examples 5 and 6, the length of the recording medium in the transport direction, to which recording can be performed within a predetermined time, was longer than in Examples 1 and 15, and the recording speed of Examples 5 and 6 was faster than the recording speed of Examples 1 and 15. In FIG. 7, the number of layers in Examples 5 and 6 was smaller than the number of layers in Examples 1 and 15. In this manner, it is preferable that the longer the discharge nozzle group of the ink in the sub-scanning direction, the faster the recording speed.

In Examples 1 and 5, the ink adhering first among the white ink and the non-white ink was ejected simultaneously with the treatment liquid. Accordingly, excellent image quality and crack resistance were obtained even without ejecting the ink adhering later simultaneously with the treatment liquid.

In Example 15, the ink adhering later among the white ink and the non-white ink is ejected simultaneously with the treatment liquid. Accordingly, even when the ink adhering first was not ejected simultaneously with the treatment liquid, excellent image quality and the crack resistance were obtained.

In Example 6, even when the ink adhering first and the ink adhering later among the white ink and the non-white ink were ejected simultaneously with the treatment liquids respectively, excellent image quality and the crack resistance were also obtained.

In Example 18, even when the non-white ink adhered before the white ink, excellent image quality and crack resistance were obtained.

In Examples 5 and 6, the discharge stability was A in both. However, in Example 5, non-white nozzles tended to generate less non-discharge nozzles than white nozzles. Also, the white nozzles of Example 5 tended to generate more non-discharge nozzles than the white nozzles of Example 6. From this, the discharge stability was more excellent in the nozzles of the discharge nozzle group that was not ejected simultaneously with the treatment liquid. In addition, it is estimated that, in the discharge nozzles of the ink which is ejected simultaneously with the treatment liquid, when the adhesion amount of the treatment liquid simultaneously ejected is large, flying of treatment liquid mist also increases and the discharge stability deteriorates.

In Examples 6, 8, and 9, when the treatment liquid adhesion amount was larger, the image quality was more excellent, but the crack resistance tended to decrease. In this manner, when the treatment liquid adhesion amount was increased, it is considered that treatment liquid exudation will increase to the first layer and the second layer will also react. However, when the exudation increases too much, it is expected that cracking will occur. It is considered that there is a suitable treatment liquid adhesion amount in which sufficient image quality is obtained and cracking does not occur.

From the comparison of Examples 15 to 17 and 1, 2, and 4, it was found that when the recording medium temperature at the time of adhesion was high, the image quality was more excellent and the crack resistance slightly deteriorated.

From Examples 6, 12, and 13, when using a cationic polymer as the aggregating agent, the crack resistance is more excellent.

From the comparison of Examples 6 with 11, when the thickening ratio of the ink to be used was high, the image quality was more excellent. However, when the thickening ratio was low, the crack resistance or the discharge stability was more excellent.

On the other hand, from the comparison of Examples 6 with 10, when the thickening ratio of the ink to be used was high, the image quality was more excellent, the crack resistance was even more excellent. From this, it is considered that the smaller the difference in the thickening ratio between the white ink and the non-white ink, the more excellent the crack resistance.

From the comparison of Examples 2 with 3, when the ink contained a high boiling point solvent, the image quality or the scratch resistance was slightly inferior, but the crack resistance was more excellent. From this, it was found that the present disclosure is particularly useful in that even when the ink does not the high boiling point solvent and more excellent image quality or the scratch resistance was obtained, excellent crack resistance can be obtained.

On the other hand, in Comparative Examples 3 and 5, Methods (3) and (7) were used. The ink adhering first among the white ink and the non-white ink was reacted by first causing the treatment liquid to adhere, and the ink adhering later was reacted by second causing the treatment liquid to adhere. Accordingly, the image quality was obtained but the crack resistance was poor. In addition, the shorter the discharge nozzle group of the ink in the sub-scanning direction, the slower the recording speed.

Also, in Comparative Examples 4 and 7, Methods (11) and (14) were used. Since the treatment liquid adhesion step was performed after the adhesion step of the ink adhering first among the white ink and the non-white ink, bleeding of the ink adhering first was advanced and the image quality was inferior. In addition, since the ink adhering later adhered and could be immediately reacted by the treatment liquid adhering prior to the adhesion of the ink, the image quality was good, but the crack resistance was inferior. From this, using any of the white ink and the non-white ink, it was necessary to perform the treatment liquid adhesion either prior to or simultaneously with the ink adhesion step, in order to obtain the image quality. In addition, compared to Example 1 or the like, the ink adhering first among the white ink and the non-white ink is excellent in the crack resistance even when performing the treatment liquid adhesion step in which ejection simultaneous with the ink was not performed prior to the ink adhesion step. On the other hand, it was found that the ink adhering later has poor crack resistance when the treatment liquid adhesion step in which simultaneous ejection with the ink was not performed prior to the ink adhesion step.

In addition, in Comparative Examples 1 and 6, Methods (4) and (8) were used. The ink adhering first among the white ink and the non-white ink was reacted by causing the treatment liquid to adhere first. Therefore, the image quality of the ink adhering first was excellent, but the image quality of the ink adhering later was inferior. It was found that when performing the treatment liquid adhesion step first, the ink adhering first among the white ink and the non-white ink can react with the treatment liquid and image quality could be obtained, but the ink adhering later cannot sufficiently react with the treatment liquid and the image quality could not be obtained. Also, compared to Example 1 or the like, it was found that the ink adhering later among the white ink and the non-white ink can react with the treatment liquid even when the treatment liquid and the ink were simultaneously ejected before the adhesion step of later ink and the image quality could be obtained, but when performing a step of causing only the ink to adhere before the adhesion step of later ink, the reaction with the treatment liquid could not be sufficient and the image quality could not be obtained.

In addition, in Comparative Examples 1 and 6, the crack resistance was good. Therefore, compared to Comparative Example 1 or the like, it is presumed that although the ink adhering first among the white ink and the non-white ink reacts sufficiently with the treatment liquid and the image quality is good, the crack resistance does not necessarily deteriorate, whereas an excessively reaction of the ink adhering later with the treatment liquid relates to the deterioration of the crack resistance.

In addition, in Comparative Example 2, the treatment liquid adhesion amount increased using Method (4). However, compared to Comparative Example 1, since the aggregating agent could exude to the top of the layer of the ink adhering first among the white ink and the non-white ink by increasing the treatment liquid adhesion amount and the ink adhering later could also be reacted, the image quality improved. However, probably since a reaction of the ink adhering later occurred excessively due to the increased treatment liquid adhesion amount, the crack resistance was inferior.

In Reference Example 1, the thickening ratio of the used ink was low and the image quality was inferior, but the crack resistance was not inferior.

In Reference Example 2, the treatment liquid was not used, but the image quality was inferior and the crack resistance was not inferior. From this, it was found that when using the treatment liquid to obtain excellent image quality, the crack resistance became a problem.

In Reference Examples 3 and 4, the two layers of the white ink or the non-white ink adhered. However, although similar to Comparative Example 3 using Method (3), the crack resistance was good. From this, it was found that when using the white ink and the non-white ink, the crack resistance became a problem.

From these results, at least the followings were found. The cracking can be suppressed by causing the second layer to react with the treatment liquid mildly. For the purpose, it is better not to have a step of causing only the treatment liquid to adhere between the first and second layers. However, the ink of the second layer needs to react to obtain the image quality. Accordingly, it is considered that evaluation results of the image quality and the cracking can be made good by causing the minimum treatment liquid which can also react with the ink of the second layer to adhere to the first layer or by ejecting the ink of the second layer simultaneously with the treatment liquid.

The present disclosure is not limited to the embodiments described above, and various modifications can be made. For example, the present disclosure includes substantially the same configurations as the configurations described in the embodiments (for example, configurations having the same functions, methods, and results, or configurations having the same purpose and effect). In addition, the present disclosure includes a configuration in which a non-essential component of the configuration described in the embodiment is replaced. In addition, the present disclosure includes a configuration exhibiting the same operational effect as the configuration described in the embodiment, or a configuration capable of achieving the same object. Also, the present disclosure includes configurations in which well-known techniques are added to the configuration described in the embodiment.

What is claimed is:

1. An ink jet recording method comprising:
   a treatment liquid adhesion step of causing a treatment liquid containing an aggregating agent to adhere to a recording medium;
   a white ink adhesion step of causing a white ink containing a white pigment to adhere to the recording medium by an ink jet method; and
   a non-white ink adhesion step of causing a non-white ink containing a non-white coloring material to adhere to the recording medium by the ink jet method,
   wherein the treatment liquid adhesion step, the white ink adhesion step, and the non-white ink adhesion step are performed by plural times of main scanning in which a recording head moves in a main scanning direction and plural times of sub-scanning in which the recording medium moves in a sub-scanning direction intersecting the main scanning direction,
   the recording head includes a first discharge nozzle group in which nozzles are arranged in the sub-scanning direction and discharge the treatment liquid, a second discharge nozzle group in which nozzles are arranged in the sub-scanning direction and discharge the white ink, and a third discharge nozzle group in which nozzles are arranged in the sub-scanning direction and discharge the non-white ink,
   the second discharge nozzle group and the third discharge nozzle group have portions that do not overlap each other when projected in the main scanning direction,
   one or both of the second discharge nozzle group and the third discharge nozzle group have a portion overlapping the first discharge nozzle group when projected in the main scanning direction, and
   the treatment liquid and one or both of the white ink and the non-white ink are adhered to a same area of the recording medium in a same main scanning by using the portion of the first discharge nozzle group that overlap the second discharge nozzle group or the third discharge nozzle group when projected in the main scanning direction, and one or both of the portions of the second discharge nozzle group and the third discharge nozzle group that overlap the first discharge nozzle group when projected in the main scanning direction.

2. The ink jet recording method according to claim 1, wherein
the treatment liquid adhesion step is performed on a recording area of the recording medium, before the white ink adhesion step and the non-white ink adhesion step.

3. The ink jet recording method according to claim 1, wherein
the treatment liquid adhesion step, the white ink adhesion step, and the non-white ink adhesion step are performed on the recording medium heated.

4. The ink jet recording method according to claim 1, wherein
the recording is performed on a low absorption recording medium or a non-absorption recording medium.

5. The ink jet recording method according to claim 1, wherein
the aggregating agent contained in the treatment liquid is one or more of a cationic resin, an organic acid, and a polyvalent metal salt.

6. The ink jet recording method according to claim 1, wherein
an area where a total adhesion amount of the treatment liquid to a total adhesion amount of the white ink and the non-white ink is from 5.0% by mass to 40.0% by mass is formed on the recording medium.

7. The ink jet recording method according to claim 1, wherein
in the white ink, a content of an organic solvent of polyols, having a normal boiling point of 280.0° C. or higher is 1.0% by mass or less relative to an ink total amount, and
in the non-white ink, a content of an organic solvent of polyols, having a normal boiling point of 280.0° or higher is 1.0% by mass or less relative to an ink total amount.

8. The ink jet recording method according to claim 1, wherein
in the main scanning, the recording head discharges the treatment liquid, the white ink, and the non-white ink while moving in the main scanning direction.

9. An ink jet recording apparatus that performs recording by using the ink jet recording method according to claim 1.

10. An ink jet recording method comprising:
a treatment liquid adhesion step of causing a treatment liquid containing an aggregating agent to adhere to a recording medium;
a white ink adhesion step of causing a white ink containing a white pigment to adhere to the recording medium by an ink jet method; and
a non-white ink adhesion step of causing a non-white ink containing a non-white coloring material to adhere to the recording medium by the ink jet method,
wherein the treatment liquid adhesion step, the white ink adhesion step, and the non-white ink adhesion step are performed by plural times of main scanning in which a recording head moves in a main scanning direction and plural times of sub-scanning in which the recording medium moves in a sub-scanning direction intersecting the main scanning direction,
the recording head includes a first discharge nozzle group in which nozzles are arranged in the sub-scanning direction and discharge the treatment liquid, a second discharge nozzle group in which nozzles are arranged in the sub-scanning direction and discharge the white ink, and a third discharge nozzle group in which nozzles are arranged in the sub-scanning direction and discharge the non-white ink,
the second discharge nozzle group and the third discharge nozzle group have portions that do not overlap each other when projected in the main scanning direction,
one or both of the second discharge nozzle group and the third discharge nozzle group have a portion overlapping the first discharge nozzle group when projected in the main scanning direction, and
wherein thickening ratios of the white ink and the non-white ink when mixed with the treatment liquid are 1.2 or more.

11. An ink jet recording method comprising:
a treatment liquid adhesion step of causing a treatment liquid containing an aggregating agent to adhere to a recording medium;
a white ink adhesion step of causing a white ink containing a white pigment to adhere to the recording medium by an ink jet method; and
a non-white ink adhesion step of causing a non-white ink containing a non-white coloring material to adhere to the recording medium by the ink jet method,
wherein the treatment liquid adhesion step, the white ink adhesion step, and the non-white ink adhesion step are performed by plural times of main scanning in which a recording head moves in a main scanning direction and plural times of sub-scanning in which the recording medium moves in a sub-scanning direction intersecting the main scanning direction,
the recording head includes a first discharge nozzle group in which nozzles are arranged in the sub-scanning direction and discharge the treatment liquid, a second discharge nozzle group in which nozzles are arranged in the sub-scanning direction and discharge the white ink, and a third discharge nozzle group in which nozzles are arranged in the sub-scanning direction and discharge the non-white ink,
the second discharge nozzle group and the third discharge nozzle group have portions that do not overlap each other when projected in the main scanning direction,
one or both of the second discharge nozzle group and the third discharge nozzle group have a portion overlapping the first discharge nozzle group when projected in the main scanning direction, and
wherein the second discharge nozzle group and the third discharge nozzle group each have a portion overlapping the first discharge nozzle group when projected in the main scanning direction.

12. An ink jet recording method comprising:
a treatment liquid adhesion step of causing a treatment liquid containing an aggregating agent to adhere to a recording medium;
a white ink adhesion step of causing a white ink containing a white pigment to adhere to the recording medium by an ink jet method; and
a non-white ink adhesion step of causing a non-white ink containing a non-white coloring material to adhere to the recording medium by the ink jet method,
wherein the treatment liquid adhesion step, the white ink adhesion step, and the non-white ink adhesion step are performed by plural times of main scanning in which a recording head moves in a main scanning direction and plural times of sub-scanning in which the recording medium moves in a sub-scanning direction intersecting the main scanning direction, the recording head includes a first discharge nozzle group in which nozzles are arranged in the sub-scanning direction and discharge the treatment liquid, a second discharge nozzle group in which nozzles are arranged in the sub-scanning direction and discharge the white ink, and a third discharge nozzle group in which nozzles are arranged in the sub-scanning direction and discharge the non-white ink, the second discharge nozzle group and the third discharge nozzle group have portions that do not overlap each other when projected in the main scanning direction, one or both of the second discharge nozzle group and the third discharge nozzle group have a portion overlapping the first discharge nozzle group when projected in the main scanning direction, and wherein the recording head includes
- a first nozzle array in which nozzles are arranged in the sub-scanning direction and are filled with the treatment liquid,
- a second nozzle array in which nozzles are arranged in the sub-scanning direction and are filled with the white ink, and
- a third nozzle array in which nozzles are arranged in the sub-scanning direction and are filled with the non-white ink, the first nozzle array includes the first discharge nozzle group, the second nozzle array includes the second discharge nozzle group and a non-discharge nozzle group which is a portion not used for recording, and the third nozzle array includes the third discharge nozzle group and a non-discharge nozzle group which is a portion not used for recording.

* * * * *